(12) United States Patent
Lepoutre et al.

(10) Patent No.: US 12,075,210 B2
(45) Date of Patent: Aug. 27, 2024

(54) SOUND SOURCE LOCALIZATION WITH CO-LOCATED SENSOR ELEMENTS

(71) Applicant: Soundskrit Inc., Montreal (CA)

(72) Inventors: Frederic Francois Leon Lepoutre, Montreal (CA); Sahil Kumar Gupta, Montreal (CA); Lucas Henrique Teixeira Carneiro, Montreal (CA)

(73) Assignee: Soundskrit Inc., Montreal (CA)

( * ) Notice: Subject to any disclaimer, the term of this patent is extended or adjusted under 35 U.S.C. 154(b) by 184 days.

(21) Appl. No.: 17/765,733

(22) PCT Filed: Oct. 5, 2020

(86) PCT No.: PCT/IB2020/000853
§ 371 (c)(1),
(2) Date: Mar. 31, 2022

(87) PCT Pub. No.: WO2021/064468
PCT Pub. Date: Apr. 8, 2021

(65) Prior Publication Data
US 2022/0408180 A1 Dec. 22, 2022

Related U.S. Application Data

(60) Provisional application No. 62/910,901, filed on Oct. 4, 2019.

(51) Int. Cl.
*H04R 1/40* (2006.01)
*G01S 3/803* (2006.01)
(Continued)

(52) U.S. Cl.
CPC ............ *H04R 1/406* (2013.01); *G01S 3/8036* (2013.01); *G01S 5/20* (2013.01); *H04R 3/005* (2013.01); *H04R 2430/20* (2013.01)

(58) Field of Classification Search
CPC .... H04R 1/406; H04R 3/005; H04R 2430/20; G01S 3/8036; G01S 5/20
(Continued)

(56) References Cited

U.S. PATENT DOCUMENTS

| | | | |
|---|---|---|---|
| 10,042,038 B1 * | 8/2018 | Lord | G10L 25/51 |
| 2015/0310857 A1 * | 10/2015 | Habets | G10L 15/14 |
| | | | 704/240 |
| 2017/0089800 A1 * | 3/2017 | Huseynov | G01S 5/20 |

FOREIGN PATENT DOCUMENTS

| | | | |
|---|---|---|---|
| CA | 2997959 A1 | | 4/2017 |
| CN | 106997037 | * | 8/2017 |

(Continued)

OTHER PUBLICATIONS

C. Lu, C. Wu, and L. Fu, "A Reciprocal and Extensible Architecture for Multi-Target Tracking in a Smart Home," in IEEE Trans. on Syst., Man and Cybernetics, Part C (Applications and Reviews), vol. 41, No. 1, pp. 120-129, Jan. 2011.
(Continued)

*Primary Examiner* — Norman Yu
(74) *Attorney, Agent, or Firm* — Lempia Summerfield Katz LLC

(57) ABSTRACT

A system includes a plurality of acoustic sensor elements co-located with one another, each acoustic sensor element of the plurality of acoustic sensor elements being configured to generate a signal representative of sound incident upon the plurality of acoustic sensor elements, and a processor configured to determine data indicative of a location of a source of the sound based on the signals representative of the incident sound. The plurality of acoustic sensor elements include a directional acoustic sensor element configured to generate a signal representative of a directional component of the sound.

20 Claims, 12 Drawing Sheets

(51) Int. Cl.
*G01S 5/20* (2006.01)
*H04R 3/00* (2006.01)

(58) Field of Classification Search
USPC .............. 381/92, 122, 313, 94.3, 94.2, 356
See application file for complete search history.

(56) References Cited

FOREIGN PATENT DOCUMENTS

| | | |
|---|---|---|
| CN | 106997037 A | 8/2017 |
| WO | 2018107171 A1 | 6/2018 |
| WO | 2019134044 A1 | 7/2019 |
| WO | 2019226958 A1 | 11/2019 |

OTHER PUBLICATIONS

D'Arca, E., Robertson N. M., and Hopgood, J. "Person Tracking via Audio and Video Fusion", 9th IET Data Fusion and Target Tracking Conference: Algorithms and Applications, 2012.

H. Wang and P. Chu, "Voice Source Localization for automatic camera pointing system in videoconferencing," in Proc. IEEE ASSP Workshop on Appl. of Signal Process. To Audio and Acoustics, New Paltz, NY, USA, Oct. 1997, pp. 1-4.

International Search Report and Written Opinion of the International Searching Authority in International Patent Application No. PCT/IB2020/000853, dated Mar. 8, 2021, 9 pages.

J. Zhou and R. Miles, "Directional sound detection by sensing acoustic flow," Sens. Phenom., vol. 1, No. 3, pp. 1-4, 2018.

Maximo Cobos, Fabio Antonacci, Anastasios Alexandridis, Athanasios Mouchtaris, and Bowon Lee, "A Survey of Sound Source Localization Methods in Wireless Acoustic Sensor Networks" Wireless Communications and Mobile Computing, vol. 2017, Article ID 3956282, 24 pages, 2017.

McCarthy, D. and Boland, F., "A Method for Source-Microphone Range Estimation in Reverberant Environments Using Arrays of Unknown Geometry". EURASIP Journal on Advances in Signal Processing, 2008.

R. K. Cook, R. V. Waterhouse, R. D. Berendt, S. Edelman, and M. C. Thomson Jr., "Measurements of correlation coefficients in reverberant sound fields," The Journal of the Acoustical Society of America, vol. 27, No. 6, pp. 1072-1077, 1955.

R. Miles, "A compliant capacitive sensor for acoustics☐: Avoiding electrostatic forces at high bias voltages," IEEE Sensors, vol. 1748, No. c, pp. 1-8, 2018.

Thiergart, 0., Del Galdo, G., Habets E., "Signal-to-reverberant ratio estimation based on the complex spatial coherence between omnidirectional microphones" 2012. IEEE International Conference on Acoustics, Speech and Signal Processing (ICASSP).

Zhou, Jian, and Ronald. N, Miles. "Sensing fluctuating airflow with spider silk." Proceedings of the National Academy of Sciences (2017): 201710559, and SI www.pnas.org/cgi/content/short/1710559114.

International Preliminary Report on Patentability from International Patent Application No. PCT/IB2020/000853, dated Apr. 5, 2022, 7 pages.

\* cited by examiner

FIG. 4

Co-located, multi-directional microphone:

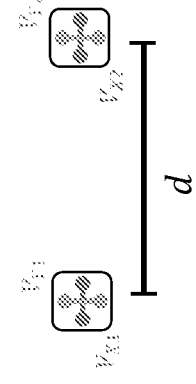

400

Example with 2 directional, orthogonal capsules (XY)

401

Example with 2 directional, orthogonal capsules plus 1 omni (XYW)

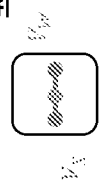

402

Example with 1 directional, orthogonal capsules plus 1 omni (XW)

Arrays of Co-located, multi-directional microphone:

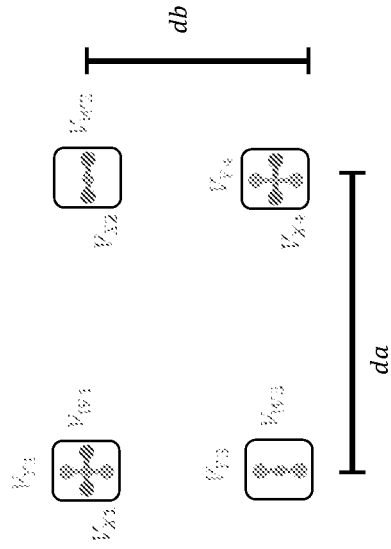

Homogeneous 2 elements arrays of spacing $d$  403

Heterogeneous 4 elements arrays of spacing $da$ and $db$  404

SOUND SOURCE LOCALIZATION WITH CO-LOCATED SENSOR ELEMENTS

CROSS-REFERENCE TO RELATED APPLICATION

This U.S. national phase application is based on International Application No. PCT/IB2020/000853, filed on Oct. 5, 2020, which claimed the benefit of U.S. provisional application entitled "System and method for localization of a sound source using flow microphones," filed Oct. 4, 2019, and assigned Ser. No. 62/910,901, the entire disclosures of which are hereby expressly incorporated by reference.

BACKGROUND OF THE DISCLOSURE

Field of the Disclosure

The disclosure relates generally to sound localization.

Brief Description of Related Technology

Typical acoustic environments include two types of sounds: direct and diffuse. Direct sound originates from a sound source and propagates with a specific direction. Diffuse sound includes ambient sounds in the environment and does not necessarily propagate with a specific direction. Typically, diffuse sound is associated with reverberation and background noise, and reduces the performance of attempts to locate a sound source. Efforts to decompose a sound field recorded by an acoustic sensing device into direct and diffuse components have thus been made.

Sound separation techniques, such as beamforming, have also been used to isolate direct sound from diffuse sound. Acoustic sensing devices have included an array of microphones spatially separated from one another so that a time delay between acoustic waves is measured. The acoustic sensing device uses the time delay to decompose a sound field recorded by the microphone array into direct and diffuse components, from which a direction of the direct sound is then determined.

The direct and diffuse sound components may be decomposed based on a correlation between two or more microphone signals. For example, microphone signals may be correlated for direct sounds and uncorrelated for diffuse sounds. However, the accuracy of this decomposition has directly depended on the distance between two microphones in the microphone array. For example, if two microphones of a microphone array are spaced apart by a relatively short distance, $d_1$, then a smaller time delay between acoustic waves is measured by the two microphones. Furthermore, if two microphones of a microphone array are spaced apart by a relatively long distance, $d_2$, then a larger time delay between acoustic waves is measured by the two microphones.

An acoustic environment having low frequency acoustic components (i.e., long wavelengths) illustrates the limitations of acoustic sensing device that relies upon two spaced apart microphones for decomposition. In one case, the microphones of the acoustic sensing device are separated by the short distance $d_1$, and may effectively sample sound at the same location. Accordingly, the acoustic sensing device may determine that the two microphone signals are correlated, even in instances where the sensed acoustic waves originate from a diffuse source. In another case, the microphones are separated by the long distance $d_2$, and may determine that the low frequency diffuse sounds are uncorrelated. However, in the latter case, if the acoustic environment includes higher frequency acoustic components, then the acoustic sensing device may experience spatial aliasing. Because of these two competing effects, typical microphone arrays are only able to properly decompose the sound field into direct and diffuse components for a limited bandwidth of sounds. Insufficient direct/diffuse sound decomposition has thus been detrimental to the performance of sound capture systems.

SUMMARY OF THE DISCLOSURE

In accordance with one aspect of the disclosure, a system includes a plurality of acoustic sensor elements co-located with one another, each acoustic sensor element of the plurality of acoustic sensor elements being configured to generate a signal representative of sound incident upon the plurality of acoustic sensor elements, and a processor configured to determine data indicative of a location of a source of the sound based on the signals representative of the incident sound. The plurality of acoustic sensor elements include a directional acoustic sensor element configured to generate a signal representative of a directional component of the sound In connection with any one of the aspects referenced herein, the systems and/or methods described herein may alternatively or additionally include or involve any combination of one or more of the following aspects or features. The directional acoustic sensor element is responsive to flow associated with the incident sound. The directional acoustic sensor element is a first directional sensor element of the plurality of acoustic sensor elements configured to generate a first signal representative of a first directional component of sound. The plurality of acoustic sensor elements include a second directional sensor element configured to generate a second signal representative of a second directional component of the sound. The first and second directional sensor elements are configured such that the first and second directional components are oriented orthogonally relative to one another. The plurality of acoustic sensor elements are disposed relative to one another such that the sound is effectively coincident upon each acoustic sensor element of the plurality of acoustic sensor elements. The system further includes an enclosure, in which the directional acoustic sensor element is one of multiple directional acoustic sensor elements of the plurality of acoustic sensor elements. The multiple directional acoustic sensor elements are disposed in the enclosure. The directional acoustic sensor element is one of multiple directional acoustic sensor elements of the plurality of acoustic sensor elements. The multiple directional acoustic sensor elements are disposed in a side-by-side arrangement on a substrate. The directional acoustic sensor element is one of multiple directional acoustic sensor elements of the plurality of acoustic sensor elements. The processor is configured to process the signals generated by the multiple directional acoustic sensor elements to determine directional component data indicative of the directional components of the sound in multiple directions. The processor is further configured to determine the directional component data as a function of a target spatial coherence and a measured spatial coherence between at least two of the signals generated by the plurality of directional acoustic sensor elements. The processor is further configured to determine a direction of arrival of the incident sound based on the directional component data. The processor is further configured to compute the measured spatial coherence and a difference of levels between at least one pair of signals generated by the multiple directional acoustic sensor elements to determine the direction of arrival. The processor is further configured to compute a spatial coherence matrix for the signals generated by the multiple directional acoustic sensor elements, such that the direction of arrival is determined based on at least one property of the spatial coherence matrix. The processor is further configured to implement a time domain method to determine the direction of arrival. The processor is further configured to determine a distance between the source and the acoustic sensor device based on the directional component data. The processor is further configured to determine a set of acoustic features of the incident sound based on the generated signals, and to implement a classifier to determine the distance based on the set of acoustic features. The classifier includes a support vector machine. The set of acoustic features includes multiple time-frequency estimators, the multiple time-frequency estimators specifying levels of the signals, a direction of arrival, a reverberation time and relative levels of direct and diffuse sound. The plurality of acoustic sensor elements further include a pressure acoustic sensor element. The processor is further configured to compare a signal generated by the pressure acoustic sensor element with the signal generated by the directional acoustic sensor element to determine the distance. The processor is further configured to generate relative phase data, relative amplitude data, or both relative phase and relative amplitude data for the signal generated by the pressure acoustic sensor element and the signal generated by the directional acoustic sensor element. The processor is further configured to implement a classifier to which the relative phase data, the relative amplitude data, or both the relative phase and amplitude data is provided to determine the distance. The processor is further configured to determine a ratio of direct sound energy and diffuse sound energy for the incident sound based on the signal representative of the directional component of the sound. The system further includes an output device, the output device including a controller. The controller is configured to control a characteristic of an output of the output device based on the location of the source.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 3:
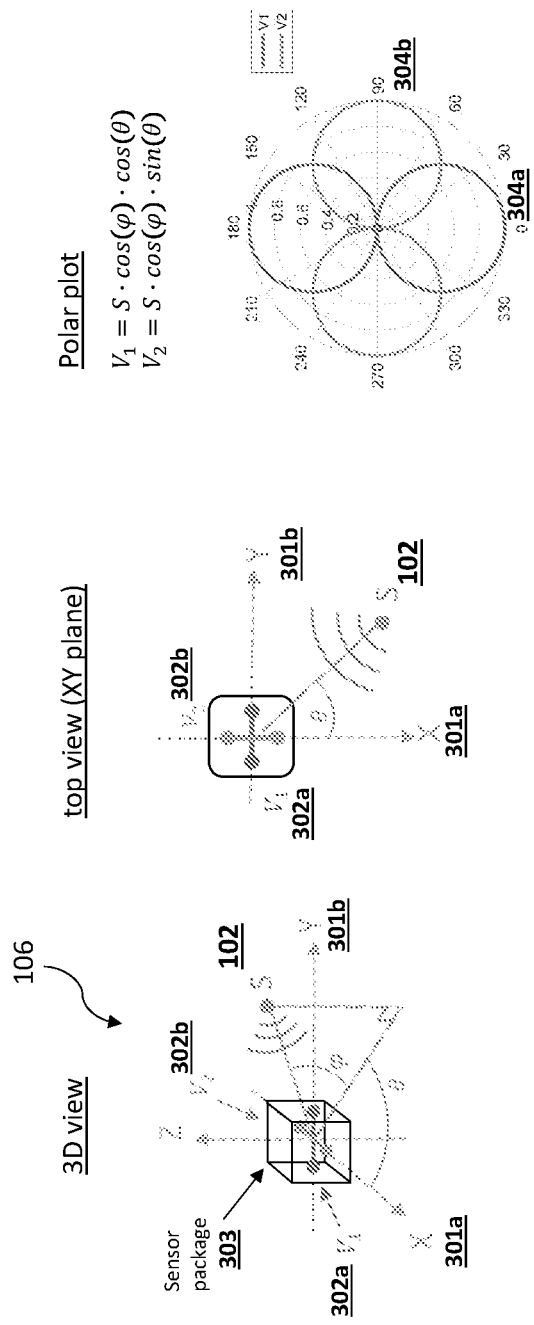

FIG. 3 schematically depicts perspective, plan, graphical views of a two-axis flow microphone or other acoustic sensor device in accordance with one example.

FIG. 4 depicts schematic, plan views of acoustic sensor devices having co-located sensor elements in accordance with several examples.

Figure 5:
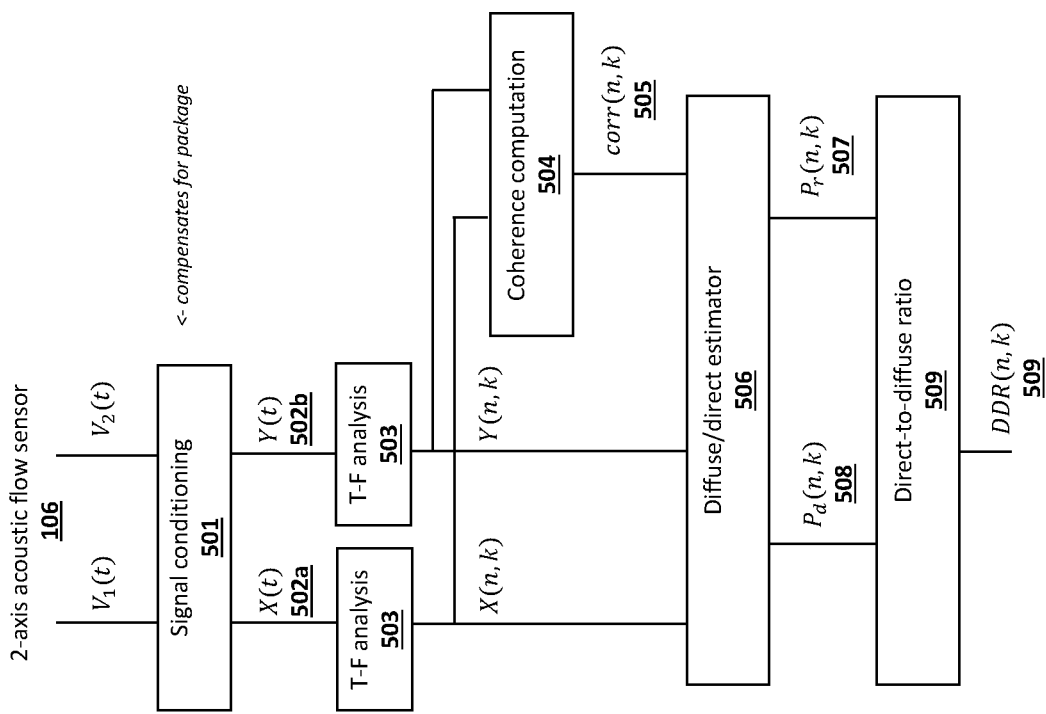

FIG. 5 is a flow diagram of a method to determine the direct-to-diffuse ratio (DDR) of a sound field captured by a two-axis flow microphone or other acoustic sensor device or system in accordance with one example.

Figure 6:
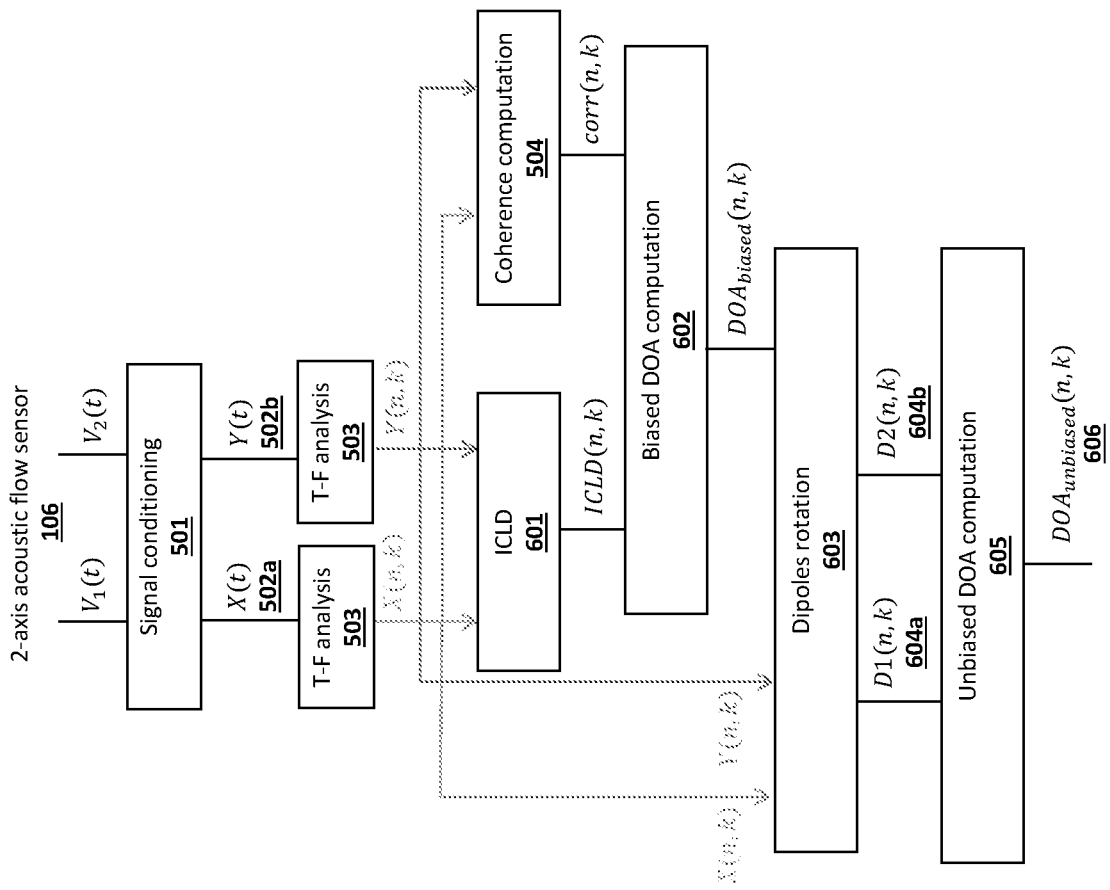

FIG. 6 is a flow diagram of a method to determine the direction of arrival (DOA) of a sound source using a two-axis flow microphone or other acoustic sensor device or system in accordance with one example.

Figure 7:
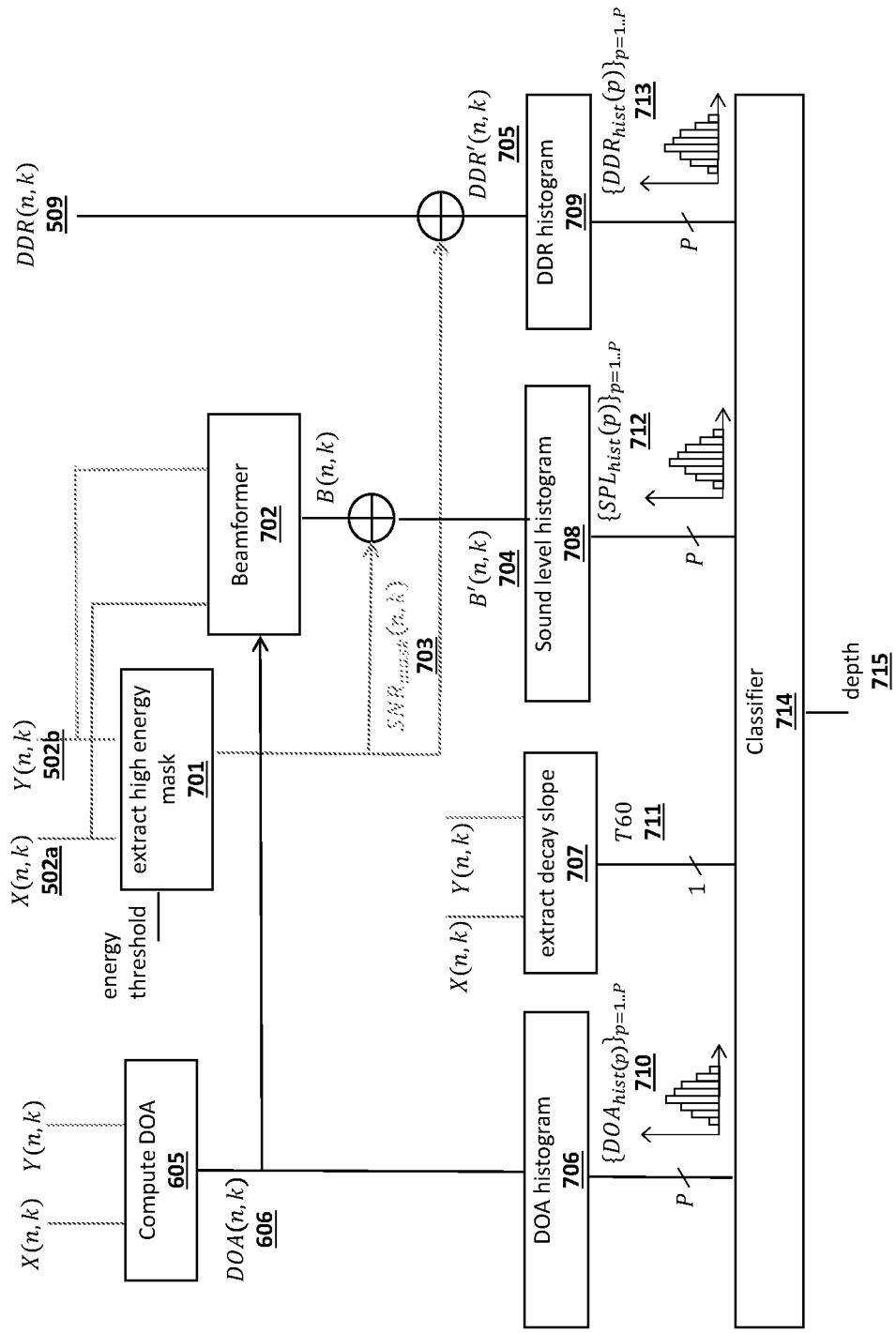

FIG. 7 is a flow diagram of a method to determine a depth or distance of a speaker or other sound source based on a determined DDR and a determined DOA in accordance with one example.

Figure 8:
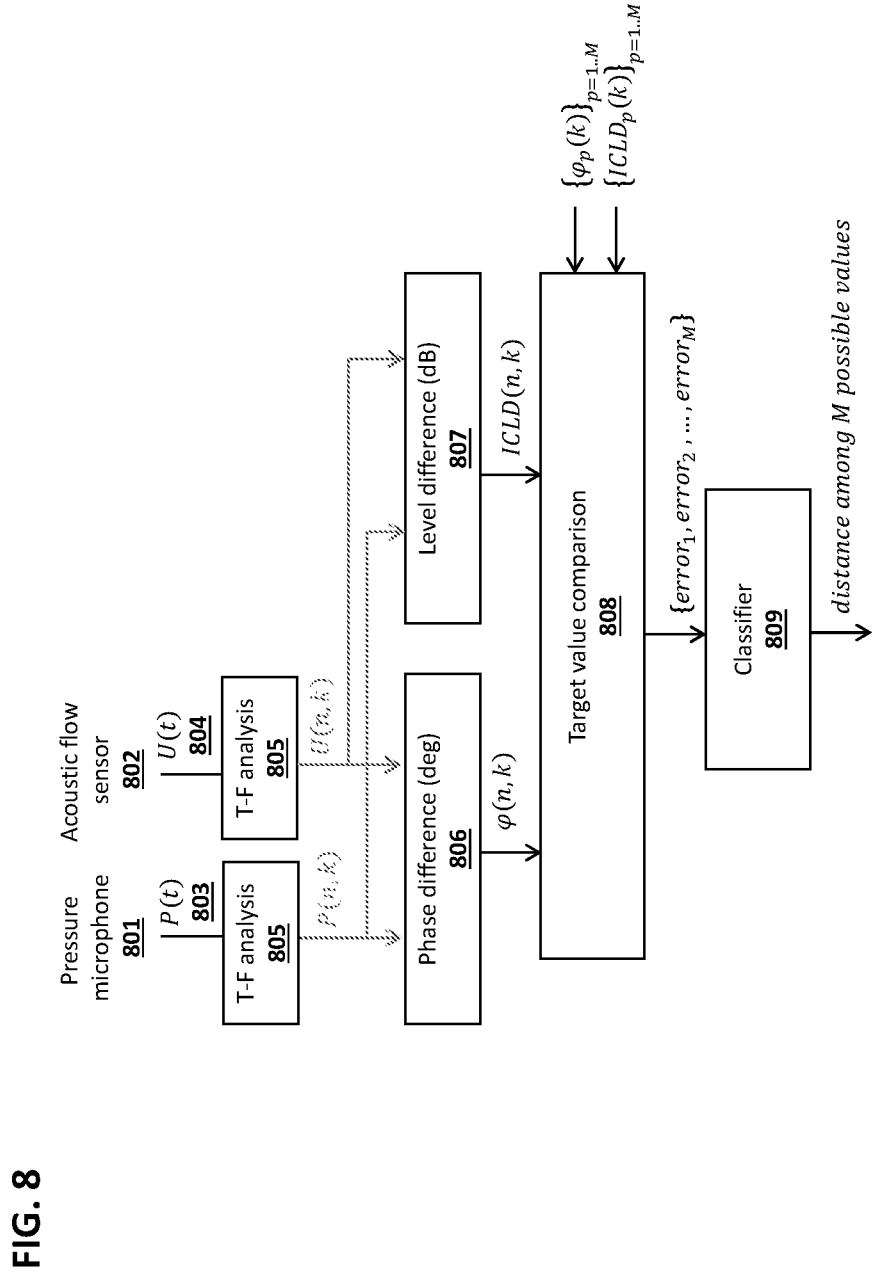

FIG. 8 is a flow diagram of a method to determine a depth or distance of a speaker or other sound source based on a signal from a flow acoustic sensor element and a signal from a pressure-based microphone or other acoustic sensor element in accordance with one example.

Figure 9:
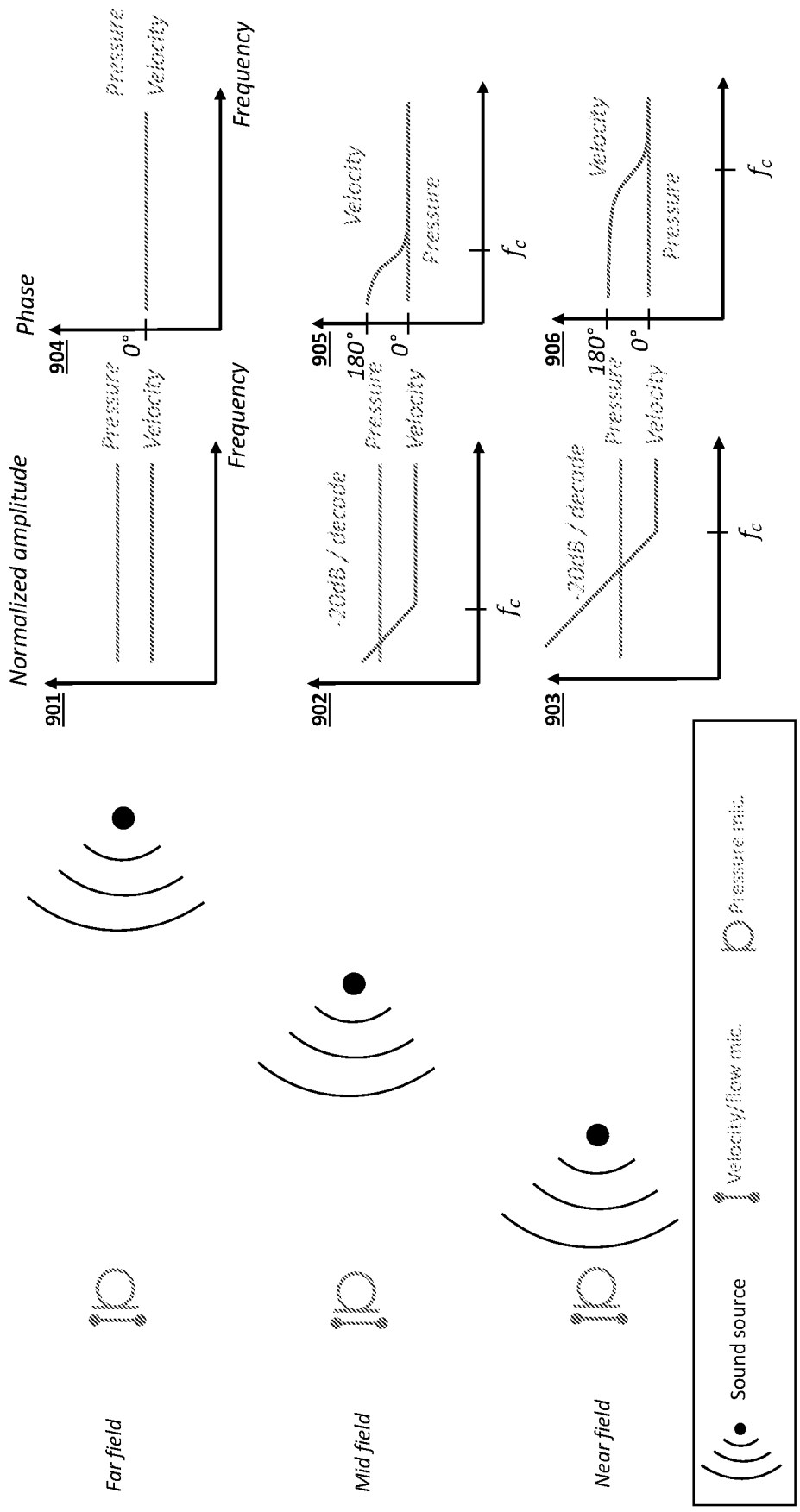

FIG. 9 depicts schematic and graphical representations of a relationship between the pressure and velocity of a sound wave in the near field and far field in accordance with one example.

Figure 10:
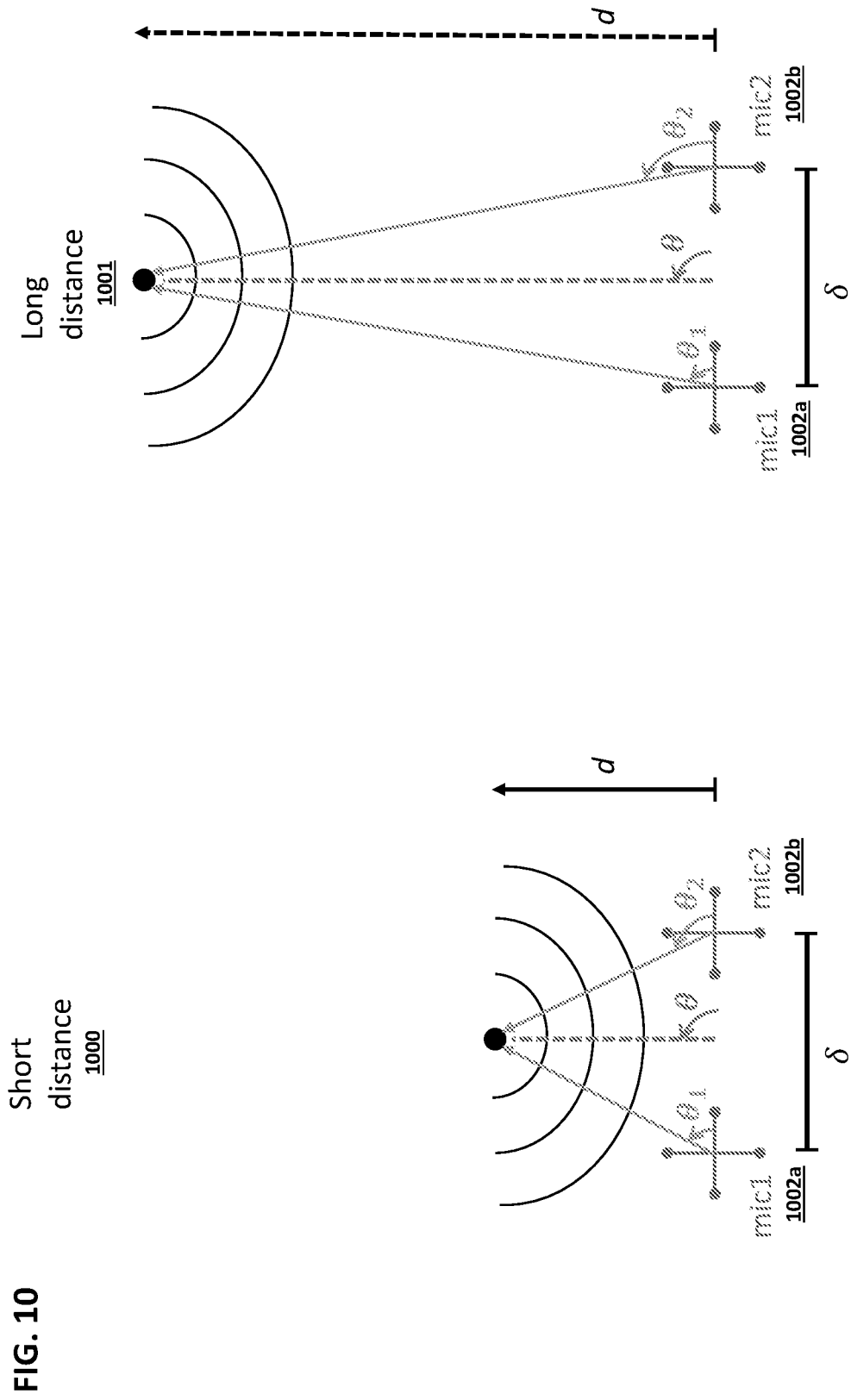

FIG. 10 is a schematic depiction of a method or technique to determine the distance of a speaker or other sound source using multiple, distributed flow microphones, each of which has co-located flow and/or other acoustic sensor elements.

Figure 11:
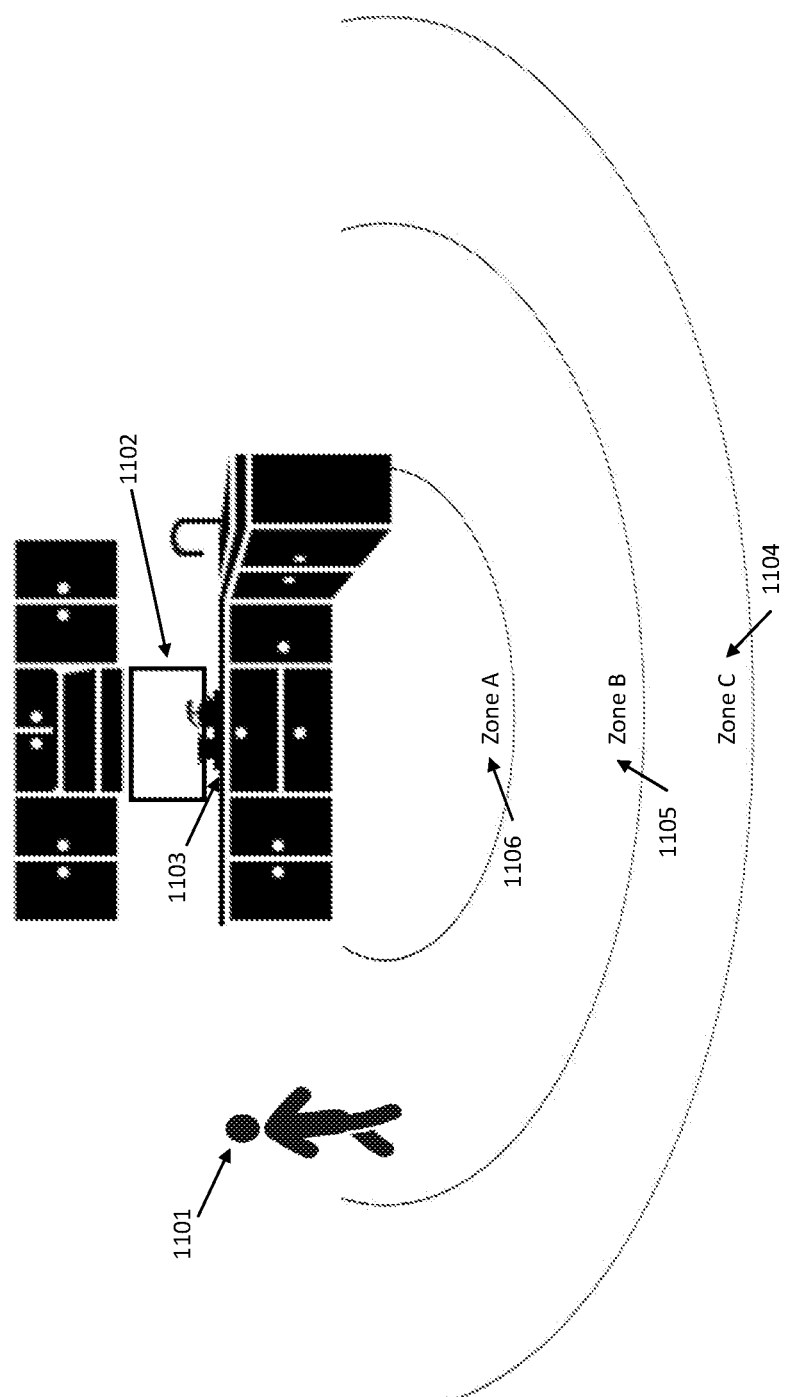

FIG. 11 is a schematic diagram of a smart kitchen system having a display that dynamically changes a characteristic of an interface based on a location of a user determined by co-located acoustic sensor elements of the smart kitchen system in accordance with one example.

Figure 12:
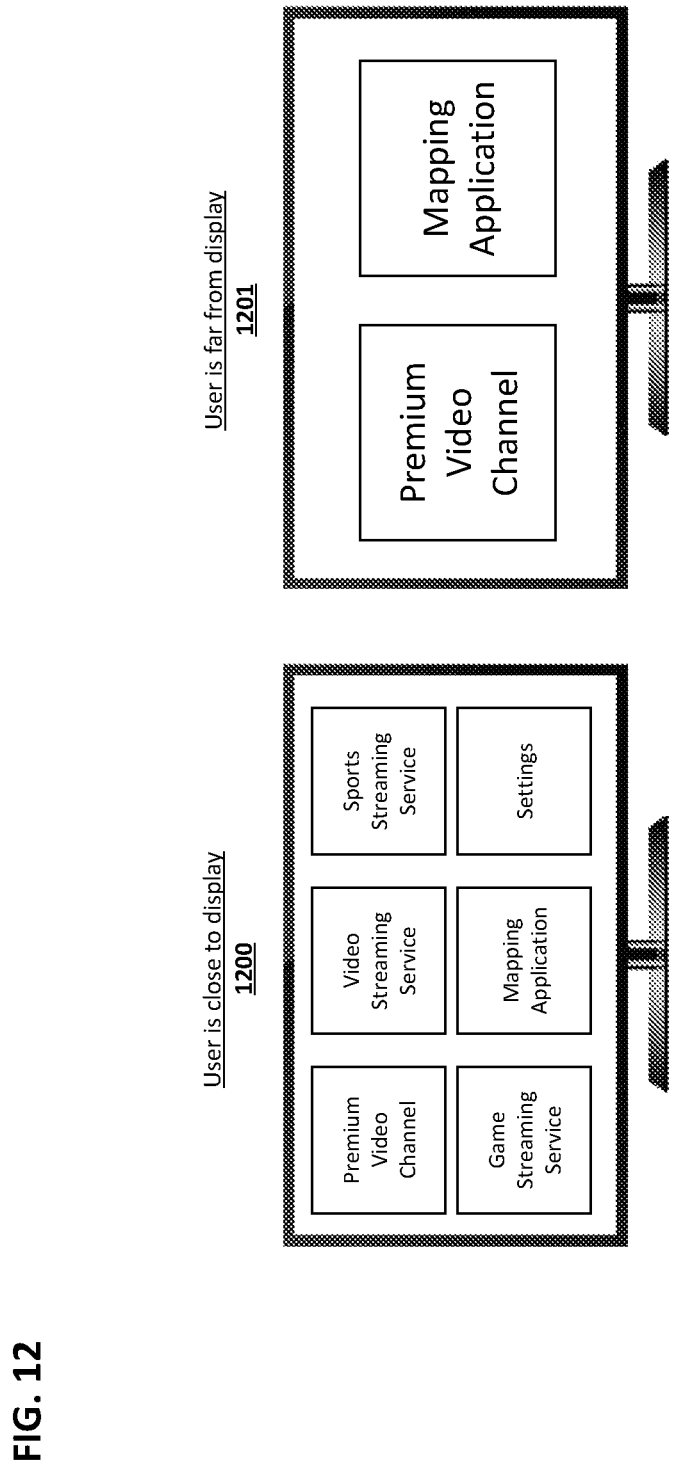

FIG. 12 is a schematic diagram of a smart display system that dynamically changes a characteristic of an interface based on a location of a user determined by co-located acoustic sensor elements of the smart kitchen system in accordance with one example.

The embodiments of the disclosed systems and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Methods and systems for localization of a sound source using flow and other directional microphones are described. In many acoustic environments, it is useful to understand the location of one or more sound sources. For example, such information may be used to isolate a desired sound source in a noisy environment, control a system based on the location of a sound, and provide contextual awareness for smart devices.

The localization of the sound source may include determining one or more location parameters. Localization data may be indicative of direction (e.g., direction of arrival of sound from the sound source) and/or depth or distance (e.g., distance between the sound source and the acoustic device). The disclosed methods and systems provide more accurate localization data (e.g., greater accuracy in the direction) relative to past acoustic sensing devices. The disclosed methods and systems are thus capable of accurately determining whether the sound source originates close to the acoustic device, or far from it. As a result, the localization provided by the disclosed methods and systems is capable of appropriately understanding an acoustic environment.

The disclosed methods and systems include a plurality of co-located acoustic sensor elements. One or more of the co-located acoustic sensor elements are configured as directional acoustic sensor elements, such as flow sensor elements. The co-location and directional nature of the acoustic sensor elements supports the generation of more accurate and complete localization data. The co-location and directional nature of the acoustic elements helps to avoid the problems and challenges presented by past systems, such as those involving microphone arrays distributed over a large area. In some cases, the disclosed methods and systems use multiple directional sound sensors (or other acoustic sensor elements) that are oriented (e.g., orthogonally) or otherwise configured to provide a complete and accurate direct/diffuse decomposition of a sound field across the entire range of audible frequencies.

One or more of the directional acoustic sensor elements may be configured as a flow microphone or other acoustic flow sensor element. Flow sensor elements are configured to respond primarily to the viscous forces due to acoustic flow in a medium (e.g., air) rather than pressure. Flow-based sensing provides directional acoustic sensor elements that maintain directivity across the entire audible range. The disclosed methods and systems may use multiple flow sensor elements (e.g., two or more sensing elements of a flow microphone) oriented orthogonally or otherwise configured to determine vector components of a sound field. For example, the multiple flow sensor elements may be arranged as a 2-axis flow microphone or multi-axis flow microphone depending on the number of sensing elements. The multiple flow sensor elements may be fabricated and disposed on a single chip (or other substrate) or on separate chips (or other substrates) packaged together in the same enclosure. In many cases, the disclosed methods and systems may utilize the observation that two or more orthogonal signals are correlated if subject to a direct sound, regardless of the frequency. Similarly, for diffuse sounds, two orthogonal signals are strongly uncorrelated.

Several techniques for processing the directional (e.g., orthogonal) and other signals of the acoustic sensor elements are described for the directional and distance localization of a sound source. In some cases, the measured sound field is analyzed in the time-frequency domain, and the direct and diffuse sound components are extracted or otherwise determined. The direction and distance of the direct sound sources may then be determined from one or more such components. Additionally, a wide variety of new features and applications are described that use the localization information determined for the sound source(s).

The disclosed methods and systems are not limited to decomposing the sound field into direct and diffuse components for a limited bandwidth of frequencies. The disclosed methods and systems are instead capable of providing a more accurate acoustic localization across the entire audible range of frequencies. The disclosed methods and systems are thus not hampered by the competing effects of spatial aliasing and attenuation. As a result, the direct/diffuse sound decomposition of the disclosed methods and systems enables accurate acoustic localization, which, in turn, supports higher-level features based on the ability to determine an acoustic source location.

The disclosed methods and systems are useful for localizing acoustic sources across a large bandwidth. The disclosed methods and systems are configured to provide a complete and accurate direct/diffuse decomposition of a sound field across the entire audible range of frequencies. In some cases, the disclosed methods and systems process the signals from a plurality of acoustic sensor elements, analyze the sound field in a time-frequency domain, and extract direct and diffuse sound components.

Although described hereinbelow in connection with a system having a two-axis flow microphone, the disclosed methods and systems may include or use a wide variety of acoustic sensor element arrangements. For instance, the disclosed methods and systems may include or use microphones and/or other acoustic sensor devices having one or more multi-axis flow microphones (or other acoustic sensor devices), single-axis flow microphones (or other acoustic sensor devices), and pressure-based microphones (or other acoustic sensor devices). The disclosed methods and systems are also not limited to use with flow acoustic sensor devices. Other types of directional acoustic sensor devices may be used, including, for instance, microphones that respond to the pressure gradient across a moving diaphragm or microphone arrays that measure the pressure of a sound field at two spatially separated points. Examples of such devices include ribbon microphones, condenser microphones, electret microphones, microphone arrays including multiple (e.g., four) MEMS omni-directional microphones, e.g., organized along a circle of diameter 40 mm.

Figure 1:
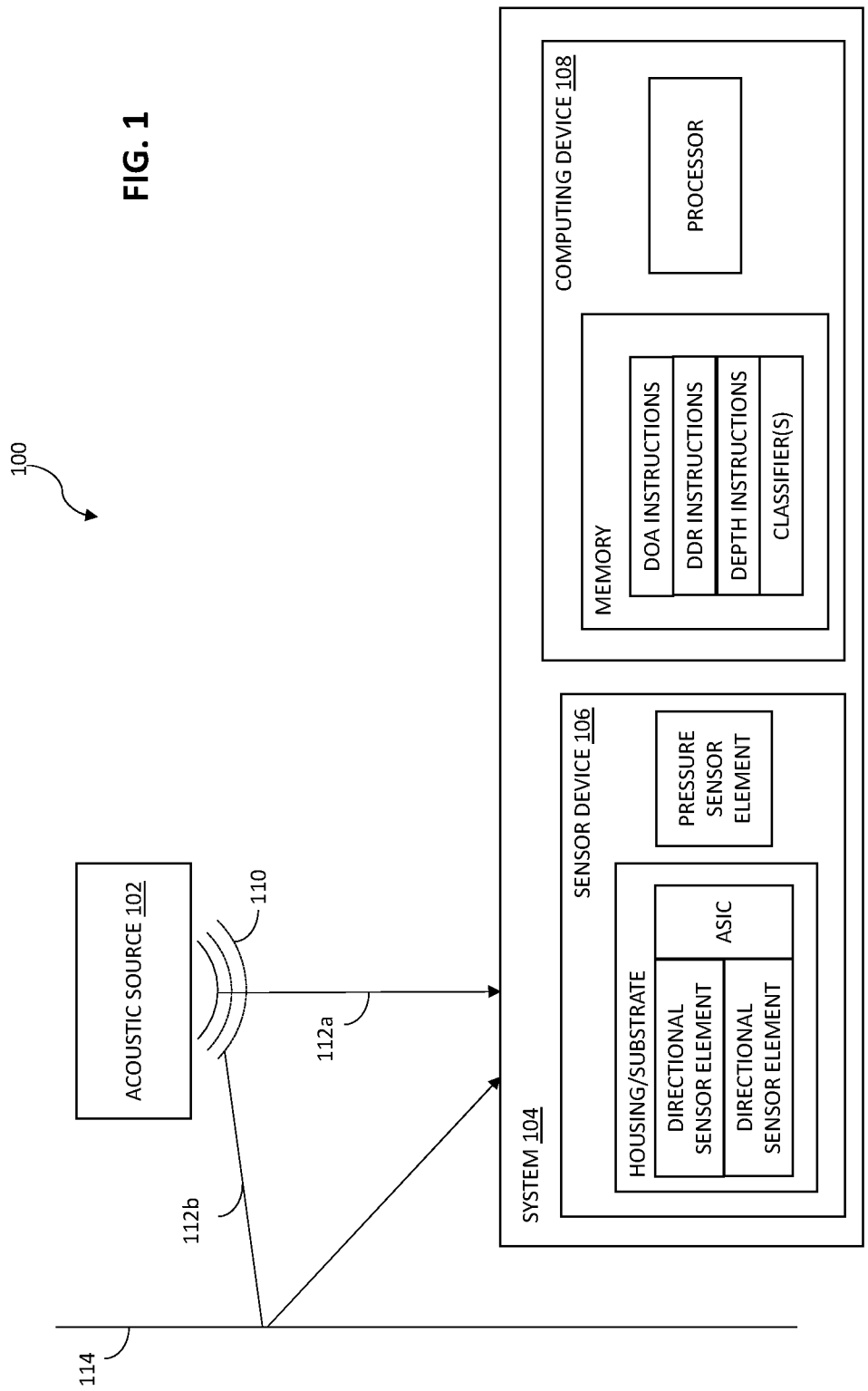
FIG. 1 is a block diagram of a system for localization of a sound source in an acoustic environment in accordance with one example.

FIG. 1 is a block diagram of an acoustic sensing environment 100 in accordance with one example. Acoustic sensing environment 100 includes acoustic waves 110 emitted by acoustic source 102 and received or captured by system 104. Acoustic waves 110 are propagated in all directions and further includes direct path 112a, which is the first of acoustic waves 110 received by acoustic sensing device 104 and corresponds to sound directly radiated by acoustic source 102. System 104 includes acoustic sensor device 106 and computing device 108. The acoustic sensor device 106 is configured to capture or sense acoustic waves 110. The computing device 108 is configured to process and analyze the sensed acoustic waves 110, respectively. In this example, acoustic sensing environment 100 includes acoustic wave reflecting component 114, in which in-direct path 112b impinges acoustic wave reflecting component 114 and is reflected toward system 104.

In this case, acoustic source 102 may be or otherwise include any emitting source of acoustic waves 110. For example, acoustic source 102 may emit both direct and diffuse sound having frequencies ranging from 20 to 20,000 Hz. Furthermore, acoustic source 102 may emit acoustic waves 110 at a constant and/or variable amplitude during a given sensing time domain of acoustic sensing device 104. In some cases, acoustic source 102 may emit acoustic wave 110 having constant and/or variable acoustic properties during a given sensing time domain. In addition to frequency and amplitude, such acoustic properties include, but are not limited to, sound pressure, particle velocity, particle displacement, sound intensity, sound power, sound energy, sound energy density, sound exposure, acoustic impendence, transmission loss, and combinations thereof. The distance between acoustic source 102 and acoustic sensing device 106 may be fixed and/or variable during a given sensing time domain. In one example, acoustic source 102 may remain close to acoustic sensing device 106 (e.g., less than 1 cm). In another example, acoustic source 102 may remain distant from acoustic sensing device 106 (e.g., greater than 1 m). In yet another example, acoustic source 102 may transition between different spatial orientations relative to acoustic sensing device 106 during a given sensing time domain of acoustic sensing device 106.

In some cases, more than one acoustic source 102 may be included in acoustic sensing environment 100. Furthermore, each of the more than one acoustic source 102 may independently emit a corresponding acoustic wave 110 from one another. For example, a first and a second of the more than one acoustic source 102 may emit direct sound and diffuse sound, respectively. In this example, each of the more than one acoustic source 102 may have constant and/or variable acoustic properties and be disposed in constant and/or variable spatial orientations relative to acoustic sensing device 104 during a given sensing time domain.

Acoustic sensing device 104 represents a component configured to receive, process and analyze acoustic wave 110. In this example, acoustic sensing device 104 includes sensor 106 and computing device 108. In other cases, acoustic sensing device 104 may include a micro-electromechanical system (MEMS) sensor 106 and is operatively connected to a separate computing device 108 (not depicted). Acoustic sensing device 104 may be implemented in various applications that involve spatial sound capture. Some of the specific applications include, but are not limited to: studio microphones, smartphones, smart home devices (voice assistant, smart speakers, smart TV, etc.), teleconferencing devices, drones/UAVs, AR/VR devices, building/property security systems, wearable devices, hearing aids/hearables, laptop/tablet devices, automotive device, and noise emission testing/machine monitoring.

Sensor 106 represents a component configured to receive and measure properties of acoustic wave 110. In this example, sensor 106 is a directional microphone configured to reject off-axis noise while capturing on-axis sound without attenuation, based on sensed acoustic flow. In one example, sensor 106 includes a fiber of a mass and stiffness low enough to move exactly with the flow of a surrounding fluid medium, in this case air. An electrical signal corresponding to the particle velocity of the air flow is output by electromagnetic transduction. The fiber is conductive (e.g., stainless steel) and placed within a magnetic field such that movement of the fibers induces a voltage. An array of these fibers is used and connected in series to increase the sensitivity of the microphone and create a 1-D microphone that outputs an electrical signal based on sounds coming in a single direction. In another example, multi-directional microphones that can capture sound coming from different directions by using multiple layers oriented in different directions. In another example, sensor 106 includes at least two conductors isolated from each other by at least one spatial gap and a displaceable element configured to move along an axis of displacement having a directional component crossing the spatial gap responsive to the flow of a surrounding fluid medium. An electrical signal corresponding to the particle velocity is output by capacitive transduction. In another example, multiple capacitive sensors may be placed in close proximity to one another such that acoustic waves 110 reach the multiple capacitive sensors with a negligible time difference. In this example, sensor 106 is a two-axis flow microphone. In other cases, sensor 106 includes one or more multi-axis flow microphones, single-axis flow microphones, and/or pressure-based microphones.

Computing device 108 may be or include an electronic device or other component configured to receive sensor signals from sensor device 106 and analyze the sensor signals to determine localization or other data indicative a location of the acoustic source 102, e.g., of direct sound emitted from acoustic source 102. In general, computing device 108 may be or include any processor capable of executing machine-readable program instructions, in accordance with one example. In this example, the computing device 108 includes a processor and a memory in which one or more instructions sets are stored. Execution of the instructions sets by the processor may cause the processor to implement one or more of the methods described herein. In the example of FIG. 1, instructions are stored in or on the memory for computation, determination or other processing of localization data, such as direction of arrival (DOA), depth-to-diffuse ratio (DDR), depth (or distance). Instructions and/or data to support the implementation of one or more classifiers is also stored in the memory. Further details regarding the procedures or methods implemented via execution or other use of the classifier and other instructions are set forth below in connection with a number of examples. Additional, alternative, or fewer instructions sets may be stored in the memory. For example, the instructions sets may be integrated with one another to any desired extent.

The processor may include one or more processing elements. In some cases, the processor includes a general-purpose processor and/or a digital signal processor. The memory may include one or more memory units, storage devices, or other memory devices. In some cases, the memory includes one or more random access memory units. The configuration and other characteristics of the processor and the memory may vary considerably.

Acoustic wave reflecting component 114 is configured to reflect in-direct path 112*b* in a direction towards acoustic sensing device 104. For illustrative purposes, a single acoustic wave reflecting component 114 is depicted in FIG. 1. However, it should be understood that more than one acoustic wave reflecting component 114 may be disposed in acoustic sensing environment 100 (see, e.g., parts A-D of FIG. 2. In some examples, acoustic sensing environment 100 is within a room, such that acoustic wave reflecting component 114 is or includes at least one wall of the room. As described further in connection with parts A-D of FIG. 2, in-direct path 112*b* may be or correspond with early reflections (e.g., arriving within a few milliseconds after direct path 112*a*) and/or late reverberations (e.g., arriving hundreds of milliseconds after the direct path 112*a*).

Acoustic sensor device 106 includes a plurality of acoustic sensor elements co-located with one another. Each acoustic sensor element is configured to generate a signal representative of sound incident upon the plurality of acoustic sensor elements. The plurality of acoustic sensor elements includes one or more directional acoustic sensor elements. Each directional acoustic sensor element is configured to generate a signal representative of a directional component of the sound, as explained further below. In some cases, the directional acoustic sensor element(s) may be or include a flow acoustic sensor element (e.g., responsive to flow associated with the incident sound). Alternative or additional types of directional sensor elements may be used. In the example of FIG. 1, the acoustic sensor device 106 includes two directional sensor elements (e.g., flow sensor elements) and a pressure sensor element (e.g., non-directional sensor element). One of the directional sensor elements may be configured to generate a first signal representative of a first directional component (e.g., along a first axis) of the incident sound, while the other directional sensor element is configured to generate a second signal representative of a second directional component of the sound (e.g., along a second axis). Additional, fewer, or alternative sensor elements may be included. For example, only a single directional sensor element may be included in some cases, as explained further below. The pressure sensor element is optional.

The co-located nature of the acoustic sensor elements may be established in various ways. In the example of FIG. 1, the directional sensor elements are co-located in the sense that the elements are disposed in the same housing or enclosure (e.g., a common housing or enclosure). Alternatively or additionally, the directional sensor elements are co-located in the sense that the elements are disposed side-by-side on the same board (e.g., printed circuit board) or other substrate. For example, any number of the sensor elements (e.g., directional or non-directional sensor elements) may be, or otherwise, include micro-electromechanical systems (MEMS) structures or elements. In the example of FIG. 1, the directional sensor elements are integrated with an application specific integrated circuit (ASIC).

The extent of integration may vary from the example shown. For instance, the directional sensor and/or other sensor elements of the system 104 may or may not be disposed in the same enclosure, but nonetheless be sufficiently close to one another to be co-located. In some cases, the co-located sensor elements may be spaced apart from one another on the order of millimeters (e.g., 3 mm spacing between adjacent elements). In contrast, sensor elements that are not co-located may be spaced apart by greater distances, such as on the order of centimeters or meters.

Co-located sensor elements may be located sufficiently close to one another to avoid spatial aliasing effects. For instance, to avoid spatial aliasing effects, the sensor elements may be spaced apart by less than half of the distance corresponding with the wavelength of sound in the audible range. The wavelength of sound at 20 kHz is 17 mm. Thus, in some cases, co-located sensor elements are those that are spaced apart by less than 8.5 mm, although greater distances (e.g., less than 1 cm) may nonetheless avoid significantly detrimental spatial aliasing effects, and thus be used in other cases.

The co-location of the sensor elements may also be established via, and/or otherwise relate to, one or more characteristics relating to the manner in which the elements respond to the viscous forces of the airflow. This allows the elements to get sufficient motion even when made very small. For instance, a sensor element may be made to respond to airflow by using fiber-like structures or cantilevers, making the sensor element sufficiently thin to improve compliance. Alternatively or additionally, porous structures (e.g., a plate with holes) may be used to allow air to pass through it and drag the structures back and forth. Materials used in making these structures may include silicon, polysilicon, amorphous silicon, silicon nitride, and various oxides. The structures of the co-located sensor elements may also be relatively lightweight and compliant. Additionally, an electrical readout mechanism is used to transduce the mechanical motion of the element into an electrical signal that does not significantly impede the mechanical motion of the sensor elements or cause instability, such as pull-in instability. One example readout mechanism uses a capacitive arrangement that adds minimal electrostatic forces, or stiffness, to the transducer (as described in one of the patent publications referenced herein). Other readout techniques may be used, including optical readout techniques.

Various miniaturization and other physical characteristics may support the co-location of the sensor elements. For instance, a housing or other packaging with side-by-side sound ports may be used. Such packaging allows for sensor device arrangements in which two directional elements are encapsulated very close to each other. In such cases, each sensor element may be or include a respective MEMS die bonded onto a PCB, two separate directional elements built on the same MEMS die, or two directional elements that are mechanically coupled. Alternatively or additionally, two or more MEMS elements may be used to determine one directional signal (e.g., MEMS elements for two directions). This approach may improve directionality and avoid unwanted package resonances, while also improving microphone sensitivity.

In the example of FIG. 1, the pressure sensor element is co-located with the directional sensor elements. In other cases, the extent to which the pressure sensor element is co-located with the directional sensor elements may vary, for instance, in accordance with the extent of integration within the sensor device 106. In other cases, the system 104 may include multiple sensor devices. For instance, the system 104 may include an additional sensor device (e.g., microphone) that includes one or more additional sensor elements (e.g., pressure sensor element).

The arrangement of sensor elements may vary in other ways. For instance, the acoustic sensor elements of the sensor device 106 may be co-located in alternative or additional ways. For instance, the sensor elements may be co-located in the sense that the sensor elements are disposed relative to one another such that the sound is effectively coincident upon each acoustic sensor element. In this regard, effectively coincident sound may involve or include situations in which the difference in the arrival times is negligible. A negligible difference does not have a discernable effect on an output. For example, a negligible difference may be within the measurement or processing error of the system 104.

The system 104 may include additional, alternative or fewer components. For example, the system 104 may include additional processing components, such as an analog-to-digital converter (ADC) or audio codec. In the example of FIG. 1, the ADC and/or other processing functionality may be provided by the ASIC.

Figure 2:
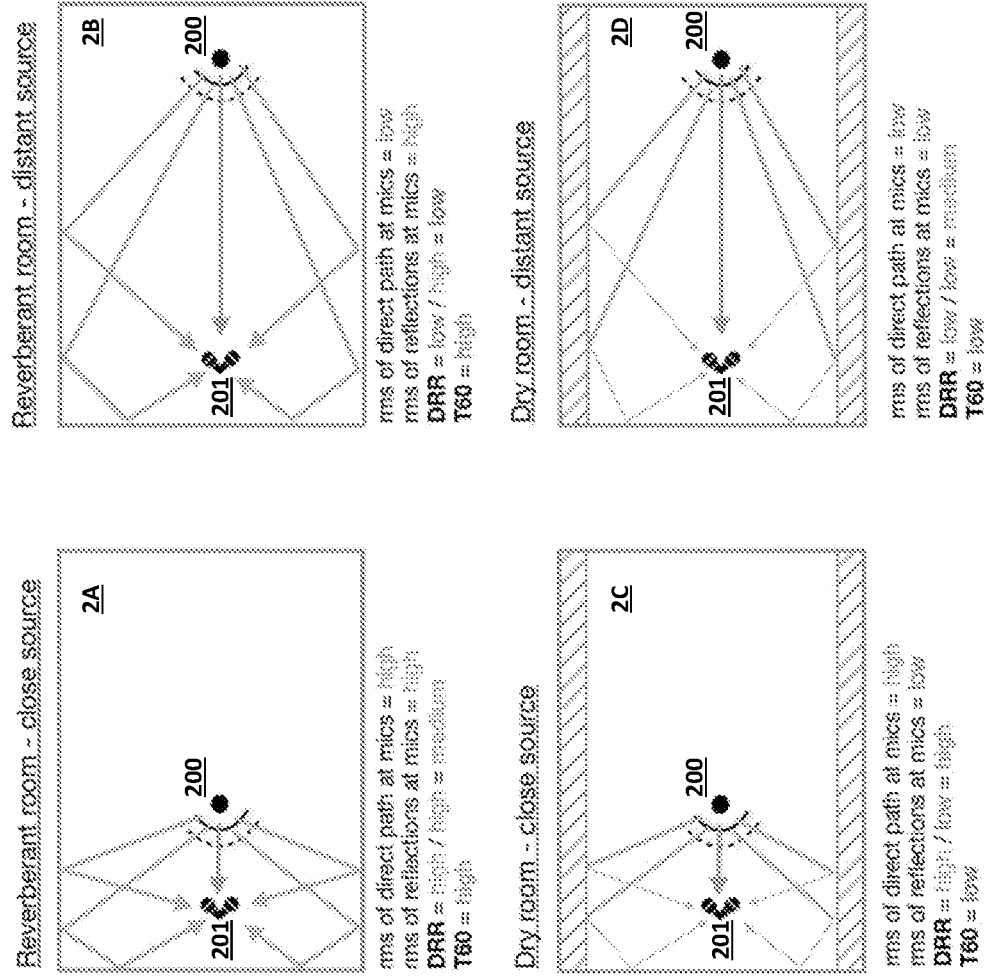
FIG. 2 depicts schematic views of example acoustic environment scenarios in which a sound source is located by the system of FIG. 1 or other system or method disclosed herein.

FIG. 2 illustrates the propagation of sound in four example acoustic sensing environments 100. In all scenarios, a point source 200 emits sounds inside a room, captured by one or more microphones 201. The sound emitted by the source propagates in all directions. The first acoustic wave to reach the microphones 201 is called the direct path. It corresponds to the sound directly radiated by the sound source. This would be the only sound captured if the walls were perfectly absorbing. In reality, the walls are reflective to sound. Therefore, the sound that impinges the wall is reflected and re-emitted inside the room. These duplicated acoustic waves bounce off walls, and some of these reflections reach the microphones 201.

The first reflections to reach the microphones 201 (e.g., a microphone chip having one or more sensor elements) may be referred to as early reflections, typically a few milliseconds after the direct path. After that, thousands of reflections eventually reach the microphones 201. These reflections may be referred to as late reverberation, as they arrive at the microphones 201 hundreds of milliseconds after the direct path. These reflections may have been reflected dozens of times by the walls, or other objects in the room.

The direct-to-diffuse ratio (DDR) is the ratio of the energy of the signal associated with the direct path over the energy of the signal associated with the reflections. When DDR is high, the sound field is dominated by direct path. When DDR is low, the sound field is dominated by reverb. Direct sound decreases by 6 dB every time the distance between microphones and source doubles (spherical divergence). Additionally, it is reasonable to assume that the diffuse sound level does not vary with relative mic/source position. Therefore, the DDR is a function of distance. Microphones 201 close to a sound source 200 as in part A of FIG. 2 measure a higher DDR than when far away from the sound source 200 as in part B of FIG. 2.

A challenge arises in that the DDR measured in two different rooms may vary if one is more reverberant than the other. The strength of the reflections vary from one room to another even if the distance is kept the same. In part C of FIG. 2, the room is less reverberant than in part A of FIG. 2, and so there are fewer reflections from the sound source 200 present.

In order to account for different rooms, one can look at the reverberation time (e.g., T60). The T60 time is the time taken for an impulsive sound emitted by a source to decay down to 60 dB compared to the direct path. The reverberation time is indicative of how reverberant a given room is. The T60 time typically ranges from 200 ms to 600 ms in everyday small rooms. Indeed, the T60 time is invariant of the position of the source and microphone in a given room. The reverberation time may be estimated at different frequencies, as the T60 may vary from the low to the high frequencies due to the varying amount of sound absorption caused by various materials or structures (e.g., wood, concrete, bookshelves, a sofa).

In view of the DDR and T60 across the four different room environments in parts A-D of FIG. 2, it is clear that these two metrics are useful for automatically classifying or otherwise distinguishing between sources that are a close distance and a far distance from the microphones in both dry and reverberant rooms.

In FIG. 3, one example of sensor device 106 is illustrated. In this example, sensor device 106 is a two-axis flow microphone with two flow sensor elements. The flow microphone and/or flow sensor elements of sensor device 106 may be configured as described in International Patent Publications WO 2018/107171 ("Fiber Microphone"), WO 2019/134044 ("Directional Microphone and System and Method for Capturing and Processing Sound"), and WO 2019/226958 ("Capacitive Sensor"), the entire disclosures of which are incorporated herein by reference. Other flow sensor designs may be used. For instance, the flow microphones or sensor elements may use a variety of transduction methods (e.g., electromagnetic, capacitive, piezoelectric, optical, etc.). The flow microphones or sensor elements are mechanically designed to respond primarily to the acoustic flow of an incoming sound rather than the pressure. As a result, the viscous forces from acoustic flow in the surrounding medium (e.g., air) originating from acoustic source 102 drive mechanical motion of the microphone or sensor. In some cases, a single sensing element is constructed to output a signal corresponding to the acoustic flow across along a single axis, e.g., the X-axis 301a or Y-axis 301b. In order to create a two-axis flow microphone 106, two sensing elements 302a, 302b are enclosed in sensor package 303 or otherwise co-located. One sensing element 302a outputs a signal based on the acoustic flow along the X-axis 301a and the second sensing element 302b outputs a signal based on the Y-axis 301b. The X-axis 301a and Y-axis 301b are said to be orthogonal.

Because the signals from the two sensor (or sensing) elements 302a, 302b only capture sound across a single axis, the sensing elements are said to be directional. The polar pattern of sensing elements 302a and 302b are dipoles 304a and 304b respectively. Packaging the two sensing elements 302a, 302b very close together (or other co-location) leads to several advantages. The two sensing elements 302a, 302b may be integrated onto a single chip, or separate chips enclosed in a single sensor package 303.

Alternatively, a single sensing element may be used to create a one-axis, or single-axis, flow microphone. Two one-axis flow microphones may be used in conjunction, e.g., oriented orthogonally from one another to effectively create a two-axis flow microphone. In other cases, more than two sensing elements may be used to create a multi-axis flow microphone that outputs multiple signals corresponding to any arbitrary number of axes. The axes may or may not be orthogonal relative to one another. However, sensing acoustic flow across orthogonal axes may be useful in connection with processing a measured sound field as described in connection with a number of examples depicted in figures addressed below.

The flow microphone may vary from the example shown. For instance, a single sensing element may be designed to be responsive to two or more axes, and an appropriate electrical transduction mechanism designed to separate the signal based on the axis of excitation.

In FIG. 4, a number of examples of sensor device 106 are illustrated. Sensor device 106 may be a co-located multi-directional microphone 400, 401, 402. Microphone 400 is a two-axis directional microphone, such as the one described in FIG. 3. Alternatively, microphone 401 includes two directional sensing elements in combination with an omnidirectional sensing element. This omnidirectional sensing element may be or include a traditional pressure-based sound sensor. Microphone 402 contains a single directional sensing element in combination with at least one omnidirectional sensing element.

As shown in FIG. 4, in other cases, sensor device 106 may alternatively include an array of co-located multi-directional microphones 403, 404. Alternatively, the system 104 (FIG. 1) may include multiple sensor devices 106. In one example, at least two multi-directional microphones are used with a spacing d therebetween. In another example, at least four multi-directional microphones are used in a circular or square configuration with spacing da and db between the adjacent microphones of the array.

The methods described below are for dipole microphones but may use directional microphones of alternative polar patterns. For example, some of these possible polar patterns may include but are not limited to cardioids, supercardioids, and hypercardioids. Additionally, the methods described below leverage the use of acoustic flow-based microphones but are applicable to all directional sound sensors including pressure-gradient microphones such as ribbon microphones and electret microphones. It may be useful to have directional sensing elements that are small and collocated to avoid unwanted acoustic phenomena.

The methods may be implemented by the processor of the system 104 (FIG. 1) and/or another processor. For example, the methods may be implemented by the computing device 108 and/or another computing device.

FIG. 5 depicts a method or procedure to convert the audio signals from a 2-axis flow microphone 106 to an estimate of the direct-to-diffuse ratio (DDR) for the incident sound (e.g., each time and frequency). Other techniques, procedures or methods may be used to determine the DDR for the incident sound. The method may include additional, fewer, or alternative acts.

First, signal conditioning 501 is performed on the output of a two-axis flow microphone 106, to convert the output into two orthogonal dipoles corresponding to the X vector component 502a and Y vector component 502b of the measured sound field. The signal conditioning is used to compensate and correct for non-ideal effects to the captured microphone signal due to sensor packaging effects. Such packaging effects may include but are not limited to acoustic resonances of the enclosure (i.e. Helmholtz resonance), acoustic shadowing, thermoviscous losses, and crosstalk between the two axes. Additionally, the conditioning stage may remove non-audio related signals from the microphone output such as wind noise, mechanical vibration of the microphone, or electrical signal due to power supply noise or electromagnetic interference. It may alternatively or additionally be used to compensate for distortions introduced by the electronics, sensor mismatch, and manufacturing variability. The signal conditioning may maximize the orthogonality between the two output signals 502a, 502b by altering their relative amplitude and phase.

Next, the X signal 502a and the Y signal 502b are converted into the time-frequency (T-F) domain 503 for further processing. In some cases, the time-frequency conversion may be achieved using a ST Fourier Transform (STFT), wavelet transform, or a custom filter bank. Looking at the power of and spatial coherence between the X signal 502a and the Y signal 502b, the power of the reverb field and the power of the direct sounds may be estimated.

The total power of the sound is defined as:

$$P_{tot}=P_x+P_y$$

If a separate pressure measurement W is provided or available, the estimation of the total power may be refined by computing the power of the pressure measurement, Pw. A coherence computation 504 between the X signal 502a and the Y signal 502b is performed by calculating the cross power spectral estimate. The correlation is computed by taking the absolute part of this estimate. In other implementations, both the imaginary and real parts may be used. Next, a diffuse/direct estimator 506 is implemented to decompose the measured sound field into its direct and diffuse components. The power of the diffuse sound 507 may be estimated using the equation:

$$P_r=\min(P_x,P_y)*(1-cc)$$

where cc is a scaled version of the correlation 505 between the X signal 502a and the Y signal 502b.

The power of the direct sound 508 is estimated as:

$$P_d=P_{tot}-P_r$$

Finally, the direct-to-diffuse ratio (DDR) 509 is expressed as:

$$DDR = \frac{P_d}{P_r}$$

The above-referenced estimators 507, 508, 509 may also be combined in various ways to compute a gain mask G(n,k), which boosts direct sounds and attenuates diffuse sound. Using the appropriate filter bank, the gain can be applied on each T-F bin, and a de-reverberated signal may be synthesized. One way to compute the gain is inspired by the spectral subtraction suppression rule for noise reduction:

$$G(n, k) = \frac{(P_{tot} - \text{beta} * P_r)}{P_{tot}}$$

The coefficient beta, known as the over-subtraction factor, may not be fixed and typically ranges between 1 and 5. It can vary dynamically with the direct-to-diffuse ratio to optimize the trade-off between the amount of dereverberation, distortion and musical noise.

In some cases, a priori knowledge of the direction of arrival may be used to improve the DDR estimation. The DDR estimation may also be improved by leveraging further knowledge of the nature of the sound. A sound classifier such as a voice activity detector, keyword detector, or speaker identifier may be used to optimize the tuning of the procedure. For example, if the sound source of interest is speech, the procedure may look only at those frequencies within the speech range. When speech is not present, the measured sound field may be classified as background noise and guide the diffuse estimation. A sound classifier detecting non speech related sound such as wind, may be used to inform the DDR estimator of contaminated segments of audio so that it may adjust the computation accordingly.

In FIG. 6, a procedure is shown that outputs the direction of arrival (DOA) of a sound source relative to the microphone. A direction of arrival may be estimated as a separate value for each time and frequency component of a measured sound field using the X signal 502a and the Y signal 502b from a two-axis acoustic flow microphone 106, or a single value for a specific sound source.

First, signal conditioning 501 is performed on the output of a two-axis flow microphone 106, to convert the output to two orthogonal signals (or dipoles) corresponding to the X signal 502a and the Y signal 502b (or vector components of the measured sound field. The signal conditioning 501 may be implemented as described above.

Next, the X signal 502a and the Y signal 502b are converted into the time-frequency (T-F) domain 503 for further processing. By looking at the power ratio, or inter-channel level difference (ICLD) 601 of the X signal 502a and the Y signal 502b, and the sign of the correlation 504 between the X signal 502a and the Y signal 502b, a first estimation of the DOA 602 may be extracted as follows:

$$DOA_{biased}(n, k) = \text{sign}(\text{corr}(n, k)) * \tan^{-1}\left(\frac{\text{pow}(Y(n, k))}{\text{pow}(X(n, k))}\right)$$

where corr is the real part of the coherence, pow is the power spectrum, and (n,k) is respectively the time and frequency index in the time-frequency analysis. Alternative or additional expressions or techniques for estimating, extracting or otherwise determining the DOA may be used.

This DOA estimation may be heavily biased when the sound comes from angles close to the null of either the X signal 502a or the Y signal 502b (e.g., dipole) in the presence of microphone noise, leading to potential inaccuracies in sound source localization. To overcome this bias, one can refine the DOA estimation by electronically rotating the dipoles 603 of the X signal 502a and the Y signal 502b (aimed at direction 0° and 90°) to new directions $DOA_{biased}+45°$ and $DOA_{biased}-45°$ using the following formula:

$$D1(n,k)=X(n,k)*\cos(DOA_{baised}+45°)+Y(n,k)*\sin(DOA_{biased}+45°)$$

$$D2(n,k)=X(n,k)*\cos(DOA_{baised}-45°)+Y(n,k)*\sin(DOA_{biased}-45°)$$

In this way, the desired sound source is between the two dipoles, leading to approximately the same amplitude of signal at D1 604a and D2 604b.

The new orthogonal dipoles D1 604a and D2 604b are then used instead of the X signal 502a and the Y signal 502b to refine the DOA estimation 605 using the previous formula from act 602. Because the amplitude of D1 604a and D2 604b are the same, the new DOA estimation 606 is more robust to self-noise, meaning that the estimation remains accurate even for quiet and/or distance sound sources. Note that the dipole rotation 603 may be repeated any arbitrary number of times until the desired localization accuracy is achieved.

Additionally, a post-processing procedure may be used to cluster the DOA for each time and frequency into one DOA estimation for a given sound source (e.g., estimating the angle of arrival of for a noise source and/or a speaker), or multiple DOA estimations for multiple sound sources.

In another method for localization, the direction of the sound source may be determined by steering the dipoles across many different spatial directions and selecting the direction for which the dipole has the highest SNR.

In yet another method for localization, the DOA may be estimated by leveraging the properties of the spatial covariance matrix between the X signal 502a and the Y signal 502b. By computing the rank of the matrix, the eigenvalues, and the eigenvectors, the number of sources and the direction of arrival of the sources can be obtained. In this method, the signal conditioning block 501 may be optional.

In another method, the estimation of the diffuse and direct sound may be used to remove the dipole bias.

In one version of the localization procedure, the time-frequency analysis 503 may be avoided altogether and the DOA estimated in only the time domain. Several methods may be leveraged for doing so, including the minimum variance distortion-less response (MVDR) beamformer, linearly constrained minimum variance (LCMV) beamformer, and other similar methods.

In FIG. 7, a method is illustrated that can be used to get the distance from a speaker to the device, using the previous estimators for DOA 605 and DDR 509. The described system outputs an estimation of depth once a given voice signal has been pronounced, such as a keyword. The system thus uses a separate procedure to detect the keyword (wakeword detector). This system may also be applied to non-speech sound sources such as televisions, fans, kitchen appliances, vehicles, gunshots, loudspeakers, and others.

Over the duration of the keyword (e.g., N frames), different estimators are computed, including, e.g., time-frequency (T-F) estimators 606, 704, 705 (e.g., a number M1 of these estimators), which are stored in memory (e.g., tables of N×F values where F is the number of frequency bands) and time-domain estimators 711 (e.g., a number M2 of these estimators), which are stored in memory (vectors of N values). For all time-frequency estimators 696, 704, 705, the histogram 706, 708, 709 is computed with a given resolution (e.g., P bins for each histogram). This histogram represents the distribution of the estimators' values across all frequencies and time frames over the duration of the keyword. In other implementations, the estimators may be computed over longer durations, such as the full duration of a spoken sentence.

Then, a classifier 714 (for example, a support vector machine or SVM) uses these histograms and the time-domain estimators as input features, and outputs a depth value 715 (input has M1 time-frequency features each made of P values in addition to M2 time-domain features, and the output is a scalar indicating depth). Each of the M1+M2 features represents a different aspect of the captured sound and helps make the depth estimation invariant to different room environments and different speaker scenarios. In alternative implementations, the classifier 714 may be or include any type of neural network, decision tree, random forest, linear classifier, or any other type of classification procedure.

A prior supervised training of the classifier uses a labeled data set, for example, utterances of the keyword at different distances in different rooms. Training data can be artificially generated using room simulators and convolving dry speech. In some cases, the system may learn on the go, using each new utterance of a keyword to augment a database, therefore adapting to the current room and speaker. It is also possible to use unsupervised classification procedures such as clustering methods (i.e. K-means, mixture of Gaussians, etc.).

For example, in one implementation, four features are determined as described below.

Sound level histogram 712: The X 502a and Y 502b signals of a 2-axis flow microphone are used to beamform and aim a dipole at the desired voice. An SNR mask 703 is created to throw out any time-frequency bins where the audio signal has a low SNR. This mask 703 is used to modify the beamformer 702 output and provide a time-frequency estimator related to the sound level of the speaker. This estimator is then used to compute a sound level histogram 708. When the speaker is getting closer to the device, the recorded voice is louder, so the spectrograms tend to have bins with high values more frequently, which can be noticeable in the histogram 712.

Direct-to-diffuse ratio (DDR) histogram 713: The DDR 509 is computed as described in FIG. 5. The SNR mask 703 is used to modify the DDR value and throw out any time-frequency bins where the SNR of the measured signal is low providing a modified DDR estimator 705. This estimator is used to then compute a DDR histogram 709. When the speaker is getting closer to the device, the power of the direct sound increases compared to the power of the diffuse sound, so the DDR tends to have more bins with high values (highly direct sound) which can be noticeable in the histogram 713.

Direction of Arrival (DOA) histogram 710: The DOA of the speaker is computed 605 as described in FIG. 6. The DOA estimator 606 is used to compute a DOA histogram 706. When the speaker is moving away from the device, the power of the early reflections tend to increase compared to the power of the direct sound, so the DOA tends to have more bins with angle values corresponding to the wall reflection. This reflects as a flattening of the histogram 710, corresponding to the spread of the angle of arrival of sound in the room.

T60 711: The slope of the envelope of speech after impulsive sounds, such as fricative sounds, is computed 707 using the X 502a and Y 502b signals of a 2-axis flow microphone. This slope corresponds to the sound decay of the room, which can range from 10 ms (i.e. car cabin) to 2 s (i.e. concert halls). It is relatively invariant to the position of the speaker in the room, and therefore helps make the system robust to the different types of rooms.

For all T-F estimators, before computing histograms, the bins that do not correspond to relevant information may be discarded. In the case of voice, a VAD can be leveraged to remove segments of non-speech. An SPL threshold can also be used to discard all information corresponding to silence or background noise.

In other examples, alternative or additional features may be input into the classifier 714 based on speech enhancement techniques such as cepstral coefficients and linear predictive coefficients. The alternative features may also be based on the morphological aspects of the sound spectrum including its shape, flatness, and variation over time. For example, because of the air absorption of sound, measured sounds originating at large distances from the microphone has less high frequency content than those close to the microphone.

Other alternative features may describe the environment such as room dimensions, acoustic properties of the room (i.e. absorption of the wall), wind speed and direction, number and nature of sound sources, and size of the sound source and/or other objects that interfere with the sound.

Additionally, the features input into the classifier 714 may be combined with information from other sensors such as temperature and humidity sensors, cameras, inertial sensors, infrared sensors, light sensors, ultrasonic sensors, pressure sensors, and RF sensors.

In other examples of the disclosed systems, it is also possible to feed the raw microphone outputs to the classifier.

In addition to depth, the system may also be trained to determine if the speaker is facing the device, or if he or she is oriented differently. Indeed, the orientation of the speaker within the room affects the DDR and the spectrogram of the voice, as the mouth emits sound directionally which would reduce the amount of direct sound if not facing the microphone.

Using multiple measurements of depth and direction over time, it is possible to develop a dynamic understanding of the environment. For example, the speed and trajectory of a sound source may be tracked and predicted. Direction and distance measurements that are outliers may also be removed to improve overall system accuracy. In one implementation, a Kalman filter may be used after the classifier 714.

In FIG. 8, another method is shown for estimating the distance of a sound source using one or more flow microphones in combination with one or more pressure microphones. The flow microphone may be or include a single-axis, 2-axis, or any other multi-axis sensor. The system leverages the varying phase and level difference between the two sensors as a sound source gets closer or further away from the microphone as illustrated in FIG. 9 (e.g., relationship between velocity and pressure). Indeed, considering a simple point source of sound, the relationship between acoustic particle velocity and acoustic pressure varies with the distance between the sensors and the source.

For example, in the far-field (e.g., a distance much greater than the wavelength of interest), the pressure p and velocity u in the direction of propagation measured by the flow microphone sensor are proportional at all frequencies. In this scenario, the relationship between the pressure and velocity of a sound source is described by the equation:

$$p = \rho c * u$$

where $\rho$ is the density of air and c is the speed of sound.

On the contrary, in the near field (e.g., when the distance r between the source and the sensors is small compared to the wavelength) the relationship between pressure and velocity becomes distance and frequency dependent:

$$p(r) = \frac{\rho c}{1 + \frac{c}{j 2\pi f r}} * u(r)$$

FIG. 8 displays the asymptotic frequency response (amplitude and phase) of pressure and particle velocity according to the formula above. The graphs 901, 902, 903, 904, 905, 906 show the center frequency $f_c$ which is the frequency where there is a transition between far-field behavior (above $f_c$) and near-field behavior (below $f_c$). This center frequency may be defined as a point where the amplitude response of the velocity is 3 dB higher than its value in the far-field:

$$\left| \frac{\rho c}{1 + \frac{c}{j 2\pi f r}} \right| = \frac{\rho c}{1.4}$$

So, $$f_c = \frac{c}{2\pi r}$$

As expected, the center frequency is inversely proportional to distance, so when the distance is high, $f_c$ is low. Therefore, all audio frequencies can be considered in the far-field regime. Inversely, if the distance is low, $f_c$ is high therefore all audio frequencies are in the near-field regime.

It has been shown how the phase and level difference between the pressure and velocity (measured by a flow microphone) relates to distance. Now the method of FIG. 8 is described. First the method takes both a pressure signal 803 measured by a pressure microphone 801 and a velocity signal 804 measured by a flow microphone 802 and transforms them in the time-frequency (T-F) domain using an FFT 805, or other time-frequency transform. Then the phase difference 806 $\varphi(n,k)$ and level difference 807 ICLD(n,k) are computed for each T-F bin. These values are compared to target values 808, corresponding to the expected phase and level difference between sensors for a given distance.

These expected values for $\varphi(n,k)$ and ICLD(n,k) can be determined theoretically using the point source formula previously mentioned. For example, for a distance r_1:

$$\varphi_1(n, k) = \text{angle}\left(\frac{\rho c}{1 + \frac{c}{j 2\pi f r_1}}\right), ICLD_1(n, k) = \text{abs}\left(\frac{\rho c}{1 + \frac{c}{j 2\pi f r_1}}\right)$$

The formula can be modified for different types of sound sources (ex: a loudspeaker modeled as planar piston, a human mouth modeled as a directional radiator, etc.). However, in practice, sound sources are not ideal. Therefore $\varphi(n,k)$ and ICLD(n,k) should be calibrated beforehand with a data set based on previous measurements. Another benefit is that calibration compensates for non-ideal responses of sensors when they are placed inside a package. Note that these expected values are frequency dependent, so the system does the comparison for all k frequency bands.

In some cases, the distance estimator is implemented as a classifier 809 that decides which of the M classes is most likely the distance, where each class corresponds to a certain distance. Each class p among M is associated with an expected phase $\varphi_p(n,k)$ and expected level difference $ICLD_p(n,k)$. The first stage of the classifier outputs the similarity between the current measurement and each class p. This similarity may be derived as the inner product between the two-dimensional vector $$V_{meas} = \{ICLD_{meas}(n,k), \varphi_{meas}(n,k)\}$$

and the target vector of class p:

$$V_p = \{ICLD_p(n,k), \varphi_p(n,k)\}, \text{error}_p = \text{norm}(V_{meas}, V_p)$$

where norm is the chosen norm function.

The classifier outputs the index of the class that minimizes the error between the expected and measured angle and level difference:

$$\hat{p} \text{argmin}_p(\text{error}_1, \text{error}_2, \ldots, \text{error}_M)$$

The classifier may output an average distance over all frequencies or output separate values for separate frequency bands. The latter may be used to create a histogram of distance estimations to determine the true value.

With the classifier approach described above, the resolution of the distance measurement is given by the number of classes. The resolution may however be increased by interpolating between adjacent classes or using a regression procedure instead of a classification procedure.

Additionally, given the distance of a sound source, the phase and level difference associated with the pressure and velocity signals may be used to determine the type of sound source. For example, the sound source can be identified as a point source, planar source, cylindrical source, etc.

In some cases, standing waves in the room corresponding to room modes may reduce the accuracy of the distance calculation. Indeed, standing waves introduce significant phase and level variance between the pressure and velocity measurement. As an example, the velocity amplitude is very small close to a wall while the pressure amplitude is high. Knowledge of the room dimensions and/or source and sensor positions may be used to improve the accuracy.

In FIG. 10, another technique is described for determining the distance of a sound source using multiple, distributed two-axis flow microphones based on the concept of parallax and triangulation. In this example, each microphone includes multiple co-located sensor elements (e.g., flow or other directional sensor elements) as described herein. Multiple two-axis flow microphones $1002a$, $1002b$ are spaced apart by a distance $\delta$. A sound source is located at distance d and angle $\theta$ relative to the microphones. Each microphone can determine the angle of arrival of the sound source $\theta_1$ and $\theta_2$. If the distance d tends to zero as in scenario 1000, the angle difference becomes high. If the distance d is large as in scenario 1001, the angle difference becomes small. Therefore, the two angles can be mathematically linked to the distance from the sound source. The more spacing $\delta$ between microphones, the more pronounced the angle difference for a given distance d, therefore increasing accuracy. The system may include more than two microphones.

In other examples of this method, the time difference of arrival and amplitude difference between the multiple microphones may be used to further improve the directional and distance localization accuracy.

In each of the examples described above, the two-axis acoustic flow microphone may be replaced by any combination of one or more two-axis acoustic flow microphones, one-axis acoustic flow microphones, other multi-axis acoustic flow microphones, directional microphones, and traditional pressure-based microphones. The disclosed methods are accordingly not limited to implementation using a two-axis flow microphone.

The systems described herein (e.g., the system 104 of FIG. 1) may include one or more output devices controlled in accordance with the localization data determined for the sound source(s). The distance and direction localization measurements may then be provided to the output device to dynamically change a user interface or other characteristic of the output device according to the location values provided. For instance, the distance and direction measurements may describe a location of a user, or a larger zone in which the user is speaking from.

In FIG. 11, a user 1101 is moving within a smart kitchen while cooking. The system includes a display 1102 mounted on the wall above a stovetop 1103 in which the user may pull up a graphical user interface element by using a voice command, for example a recipe. Embedded in the display 1102 is a multi-axis flow microphone that can listen for voice commands and determine which zone 1104, 1105, 1106 the user is speaking from. The information on the display may be made larger while the user is in Zone C 1104, or smaller if the user is in Zone A 1106. For illustrative purposes, only three zones are depicted in FIG. 11, though the room may be split into as many zones as desired, and the distance and direction measurements adjusted accordingly.

FIG. 12 illustrates an example involving a graphical interface of a display, e.g., a television, changing based on the distance of the user. When the user is close to the television in scenario 1200, more icons can be displayed on the menu of the television. When the user is far from the television in scenario 1201, the menu can be simplified to display less icons with the text and graphics made larger. This may make it easier to see and navigate when far away. This is just one example of many in which an interface may be modified based on the location of the speaker. As another example, instead of a menu of icons, the television may display directions on mapping application, and adjust the zoom based on the distance of the user. This reduces strain on the eyes and makes for an overall better user experience.

While FIG. 12 depicts a graphical interface that changes based on the distance from the television, other changes may involve the azimuthal directions with respect to the television.

While the example described in FIG. 12 adapts the menu displayed based on user distance, additional or alternative aspects of the interface may be adjusted as well. For example, the display brightness may be adjusted according to user location to optimize the viewing experience and conserve power. The resolution of the display may be decreased as the user moves further away to also conserve power, especially if the display is made from electronic ink technology.

In other systems, the information on the user's location may be input into a system containing a loudspeaker or other speaker. As a user moves farther away from a loudspeaker, it may be beneficial to increase the volume. Furthermore, the speaker system may make use of the Lombard effect. For instance, a smart voice assistant may modify acoustic features of its speaker output other than loudness when the user is far away. These features may include but are not limited to pitch, rate, and duration of syllables. By leveraging the Lombard effect, the smart voice assistant sounds more natural and realistic.

Often, the high frequency content of a loudspeaker may be directional. As the user moves across various angles relative to the speaker, it may also be advantageous to optimize the loudspeaker (especially in a loudspeaker array) output so that the high frequency content of the sound being played is propagated in the direction of the user.

A variety of other systems and applications may be configured to take action based on the location of a user or sound source. For example, in a video conferencing system, the location of the user may be used to steer a camera to capture only the person speaking in the frame. The distance of the user may be used as a parameter to tune how much the camera should zoom in or out. The same applies for a security camera that is listening for potential threats into a building or secured zone. A smartphone may choose to keep its display off when a user is speaking far away but turn it on when a user is close by, thus optimizing for power. A smart light or network of lights may automatically illuminate and emphasize certain zones in a room based on where the user is located. These are several examples, but not an exhaustive list, of applications that may use the information on the location of a user.

In scenarios where multiple users are detected in different locations, it may be useful to take a more conservative approach. The interface (e.g., display font, speaker output level, etc.) may revert to a standard setting and choose not to dynamically change as one or more user's change location.

The location of a sound source may be used to augment and enhance the audio-pass through functionality for headsets. For example, it can be assumed that a voice close to a user wearing a headset is directed at the user and the headset can lower the volume of music being played. On the other hand, a voice originating from a far distance can be considered background noise and should be ignored. If the voice is far away, the headset can maintain normal operation and perform noise cancellation procedures to reduce any noise heard by the user from the background voices. In another example, a person may be approaching the user to speak to him or her. In this case, the voice may originate far from the user at first, but then get closer over time. It's likely in this scenario that the direction of the incoming voice does not change, but the distance values measured becomes smaller over time. If this is the case, the headset may choose to pass through this audio as well.

Sound sources that are passed through the headset may not be limited to speech. For example, in outdoor environments where the user is crossing a street, it may be important that the user is aware of approaching vehicles. Loud music can reduce situational awareness and leave the user in a dangerous situation. If the sound of a car or sirens are approaching the user, the headset may pause or reduce any sounds being output through the headset's speakers and pass through the audio recorded from the user's environment.

The localization computation may also be used to add an extra layer to a system or device for security purposes. For example, a smartphone can choose to only wake up from voice commands given within a certain proximity to the phone. Usually a person keeps his or her smartphone within an arm's length. Thus, it may be assumed that any voice command originating from a distance greater than approximately an arm's length is likely unwanted noise and should be ignored. In another example, there may be multiple users in a collaborative environment each working on a laptop, tablet, head mounted display, and/or other device that is designed to take in voice input. In such an environment, it is important that a user talking to his or her respective device does not end up triggering other devices nearby. Thus, the location of a sound source can be used to make devices placed in multi-user scenarios more robust and minimize false positive of wake words and commands.

Alternatively, there may just be one user with multiple voice-enabled devices. For example, a user may have any combination of smart speakers, smart displays, smartphones, and smart hubs in a home. When speaking a command, it's undesirable that each device responds to the spoke command simultaneously. These devices may communicate with each other so that only the device closest to the user responds to the voice command.

Other applications of the localization measurement can be used to enhance immersive sound reproduction. Many techniques have been developed over the years for loudspeakers and loudspeaker arrays to reproduce both direct and diffuse, or reverberant, sound. To make a truly immersive and realistic sound experience, it's important to appropriately balance the amount of direct and diffuse sound output by a loudspeaker system. However, in addition to the loudspeaker output, the room environment adds additional acoustic effects to the perceived sound by a listener. Depending on the room size, number of walls, material, etc. the room can add additional reverb. The farther away from the loudspeaker the listener is, the more reverb from the room he or she perceives. Conversely, if the listener is right next to the loudspeaker, he or she may perceive no additional reverb from the room. The location measurements may be used to adapt the loudspeaker output accordingly. For example, if the listener is far away from the loudspeaker, the audio output may be tuned to output more direct sound and less diffuse sound, relying on the room effects to add reverb to the audio received at the location of the listener. On the other hand, if the listener is very close to the loudspeaker, the audio output may be tuned to output more diffuse sound, to give the user a perception of a more immersive and large sound environment.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the acoustic flow microphone 106, any component of or related to the microphone 106, etc., or accessible or connectable thereto. For example, procedures may reside in an ASIC or DSP integrated into a chip of such a microphone 3a or be part of a components in a final product in which the microphone 3a is installed, such as a smart phone. Any application or module herein described may be implemented using computer readable/executable instructions that may be stored or otherwise held by such computer readable media.

In one aspect, the systems and methods described herein are useful for determining direct and diffuse sound components of a sound field measured by at least one flow microphone. At least one signal from the flow microphone is processed to determine the direct and/or diffuse components of the sound field. In connection with this or any one of the aspects described herein, the systems and/or methods described herein may alternatively or additionally include or involve any combination of one or more of the following aspects or features. The flow microphone outputs at least two signals. At least two of the signals output from the microphone represent acoustic flow along two orthogonal directions. The diffuse and/or direct sound component is determined as a function of a target spatial coherence and a measured spatial value between two signals. The target spatial coherence is determined by the a priori theoretical expression of the flow microphone and/or its packaging. The target spatial coherence is determined by experimental measurements of the flow microphone and its packaging. The experimental measurements are updated throughout the lifetime of the flow microphone. The experimental measurements are determined at the production site and then loaded into memory. The direct and/or diffuse sound components is determined without estimated or prior knowledge of the direction of arrival (DOA) of the sound source. The energy of the direct sound component is determined from a linear combination of the total sound power energy and the direct sound component energy. A ratio is estimated as a function of the direct and diffuse sound energy. A gain is derived for each time and frequency bin as a parametric function of the direct and/or diffuse and/or total sound power. The gain is applied on at least one of the signals or a linear combination of the signals, and wherein the parameters are tuned to obtain an output signal with a different level of direct and/or diffuse sound. A classifier is used to is used to adapt any of the parameters involved in the determination of direct and diffuse sound components. A classifier is used to is used to adapt any of the parameters involved in the determination of direct and diffuse sound components. The classifier is a keyword detector. The classifier is a voice activity detector (VAD). The classifier is an audio event detector.

In another aspect, the systems and methods described herein are useful for determining the direction of arrival of a sound source using at least one signal from a flow microphone. In connection with this or any one of the aspects described herein, the systems and/or methods described herein may alternatively or additionally include or involve any combination of one or more of the following aspects or features. The flow microphone outputs at least two signals. At least two of the signals output from the sensor represent the acoustic flow along two orthogonal directions. The difference of level and spatial coherence between at least of the two signals is computed and used to determine the direction of arrival of the sound source. If the direction of arrival is biased by the self-noise of the sensor, then the signals from the sensor are recombined to represent acoustic flow along a differing directions and the direction of arrival of the sound source is recomputed using the new signals. The listening direction of the flow microphone is electronically rotated across different spatial directions and the direction with the highest signal-to-noise ratio is selected as the direction of arrival. Properties relating to the spatial covariance matrix between at least two of the signals are used to determine the direction of arrival and/or the number of sound sources. The properties of the spatial covariance matrix may include one or more of the rank, the eigenvalues, and the eigenvectors. The direction of arrival of a sound source is determined using a time domain method. The time domain method is a minimum variance distortion-less response (MVDR) beamformer. The time domain method is a linearly constrained minimum variance (LCMV) beamformer.

In another aspect, the systems and methods described herein are useful for determining the distance of a sound source relative to a flow microphone using at least one signal from the flow microphone. In connection with this or any one of the aspects described herein, the systems and/or methods described herein may alternatively or additionally include or involve any combination of one or more of the following aspects or features. The flow microphone outputs at least two signals. At least two of the signals output from the sensor represent the acoustic flow along two orthogonal directions. Acoustic features of the measured sound field are input into a classifier and/or regression procedure to determine distance. The classifier is supervised or unsupervised. The classifier is a support vector machine (SVM). The classifier is a neural network, decision tree, random tree, linear classifier, or other type of classification procedure.

The classifier uses clustering methods such as but not limited to k-means or mixture of Gaussians. The acoustic features are determined from time domain and/or time-frequency domain estimators. The acoustic features include information regarding the direction of arrival of the sound source, the reverberation time of the room, the sound level, and/or the direct-to-diffuse ratio of the measured sound field. The acoustic features include the cepstral coefficients and/or linear predictive coefficients of the signals output from the flow microphone. The acoustic features include morphological aspects of the sound spectrum including one or more of, but not limited to, the shape, flatness, and variation over time. The acoustic features describe the environment, including but not limited to the room dimensions, acoustic properties of the room (i.e. the absorption of the walls), wind speed and/or direction, number and/or nature of the sound sources, and the size of the sound/source or other objects that interfere with the measured sound field. The acoustic features are combined with information from other sensors. The other sensors may include temperature sensors, humidity sensors, cameras, inertial sensors, infrared sensors, light sensors, ultrasonic sensors, pressure sensors, or RF sensors. Audio segments containing irrelevant information are discarded. The irrelevant information is determined using a voice activity detector (VAD). The irrelevant information is determined using a sound pressure level (SPL) threshold.

In another aspect, the systems and methods described herein are useful for determining the direction a speaker is facing relative to at least one flow microphone by using the change in direct-to-diffuse ratio (DDR) over time of the sound field measure by the flow microphone.

In another aspect, the systems and methods described herein are useful for multiple calculations of the direction and/or distance of one or multiple sound sources relative to at least one acoustic flow microphone tracked over time. In connection with this or any one of the aspects described herein, the systems and/or methods described herein may alternatively or additionally include or involve any combination of one or more of the following aspects or features. The tracked information is used to determine the speed and or trajectory of at least one sound source. Calculations of the direction and/or distance that deviate significantly from the rest of the calculations are removed as outliers to improve overall system accuracy. The tracking is implemented using a Kalman filter.

In another aspect, the systems and methods described herein are useful when a first signal from at least one flow microphone is compared to a second signal from at least one pressure microphone to determine the distance of a sound source relative to the sensors. In connection with this or any one of the aspects described herein, the systems and/or methods described herein may alternatively or additionally include or involve any combination of one or more of the following aspects or features. The distance is determined by comparing the phase and/or amplitude of the first and second signals. The relative phase and/or amplitude of the first and second signals are input into a classifier to determine the most probable distance of the sound source relative to the sensors. The classifier compares the relative phase and/or amplitude of the first and second signals to expected values for a sound source at known distances. The classifier outputs an average distance over all frequencies. The classifier outputs a distance value for each frequency band of interest and a histogram may be computed to determine the most probable distance of the sound source. The classifier uses interpolation between adjacent classes representing discrete distance values to improve the accuracy of the output.

Information on the room dimensions, position of the sound source, and/or position of the sensors are used to improve the calculation of distance.

In another aspect, the systems and methods described herein are useful when at least one signal from a first flow microphone, the first signal, and at least one signal from a second flow microphone separated by a minimum distance, the second signal, are compared to determine the distance of at least one sound source relative to the sensors. In connection with this or any one of the aspects described herein, the systems and/or methods described herein may alternatively or additionally include or involve any combination of one or more of the following aspects or features. The first signal is the direction of arrival of the sound source relative to the first flow microphone and the second signal is the direction of arrival of the sound source relative to the second flow microphone. The first signal and second signal are used to determine the time difference of arrival between the first and second acoustic flow microphone. The first signal and second signal are used to determine the amplitude difference of arrival between the first and second acoustic flow microphone.

In another aspect, the systems and methods described herein are useful for changing the interface on a display in which a group of acoustic signals from a microphone is received, the direction and/or distance of the user relative to the microphone is determined, and the output of the display is changed according to the direction and distance determined. In connection with this or any one of the aspects described herein, the systems and/or methods described herein may alternatively or additionally include or involve any combination of one or more of the following aspects or features. The microphone includes a flow microphone. The microphone is or includes a plurality of acoustic sensing elements. The text and/or graphics of the display are altered based on the location of the user. The display brightness is adjusted based on the location of the user. The display resolution is adjusted based on the location of the user. The group of acoustic signals include acoustic signals generated by the user's speech. The display is a television. The display is attached to a smart speaker. The display is embedded in a kitchen appliance such as but not limited to a cooktop, refrigerator, microwave, or wall display. The display includes a LCD, OLED, LED, or AMOLED display. The display is embedded into a wearable device, for example a smart watch. The display is embedded within a device that has voice recognition capabilities. The display is embedded within a kiosk or directory.

In another aspect, the systems and methods described herein are useful for changing the output of a loudspeaker or loudspeaker array in which a group of acoustic signals from a microphone are received, the direction and/or distance of the user relative to the microphone are determined, and the output of the loudspeaker is changed according to the direction and distance determined. In connection with this or any one of the aspects described herein, the systems and/or methods described herein may alternatively or additionally include or involve any combination of one or more of the following aspects or features. The microphone includes a flow microphone. The microphone is a plurality of microphones. The group of acoustic signals include acoustic signals generated by the user's speech. The volume of the loudspeaker is increased when the user is far from the loudspeaker, and decreased when the user is close to the loudspeaker The loudspeaker output makes use the Lombard effect to adjust one or more of it acoustic features which may include the pitch, rate, and duration of syllables. The loudspeaker or loudspeaker array dynamically adjusts its output so high frequency content, which is typically directional, is always directed toward the user. The loudspeaker or loudspeaker array adjusts the amount of direct and diffuse sound output based on the location of the listener. The loudspeaker or loudspeaker array adjusts the sweet spot based on the location of the listener.

In another aspect, the systems and methods described herein are useful for controlling a smart device in which a group of acoustic signals from an embedded microphone is received, the direction and/or distance of the user relative to the microphone is determined, an action is taken according to the direction and distance determined. In connection with this or any one of the aspects described herein, the systems and/or methods described herein may alternatively or additionally include or involve any combination of one or more of the following aspects or features. The microphone includes a flow microphone. The microphone is a plurality of microphones. The group of acoustic signals include acoustic signals generated by the user's speech. The smart device is a video conferencing system that steers a camera to focus on the user currently speaking. The smart device is a security camera that steers its look direction and zoom based on the direction and distance of a detected sound event. The smart device is a smartphone that turns its display off when a user is speaking above a minimum distance from the smartphone and turns its display on when the user is speaking below the minimum distance. The smart device is a network of lights that automatically illuminate and emphasize specific zones based on the location of the user. The smart device is a headset that passes through the speech when the speaker is below a minimum distance relative to the headset and ignores speech when the speaker is above the minimum distance. The smart device is a headset that passes through the speech when the speaker's distance relative to the headset decreases over time but maintains the same direction. The smart device is a headset that passes through the sound of a vehicle or siren if the measured distance gets closer over time. The smart device only listens to users close to the device as a security measure. The smart device is a smartphone, head mounted display, laptop, tablet, or PC. The smart device is a network of smart devices that communicate with one another and only the device closest to the user is activated. The smart device is a network of smart devices that communicate with one another and only the device facing the direction of the user's face is activated.

Described above are systems and methods that use one or more directional sound sensors (or other acoustic sensor elements) to provide robust direct/diffuse sound decomposition and/or to localize sound sources, e.g., in azimuth and depth. In some cases, the acoustic sensor elements are oriented orthogonally or otherwise configured to provide orthogonal signals. In some cases, one or more of the acoustic sensor elements is configured as an acoustic flow sensor (or flow acoustic sensor element). The flow sensor element responds primarily to the viscous forces due to acoustic flow in a medium (e.g., air) rather than the pressure or pressure difference. This provides directional microphones (or other acoustic sensor devices) that maintain directivity across the entire audible range with a high sensitivity. The disclosed methods and systems may use flow microphones in which two or more sensing elements of a flow microphone are oriented orthogonally to determine the vector components of a sound field—e.g., a two-axis flow microphone or multi-axis flow microphone depending on the number of sensing elements. The multiple elements may be fabricated on a single chip or otherwise integrated or arranged (e.g., on separate chips packaged together in a common or same enclosure) such that the elements are co-located.

The steps or operations in the flow charts and diagrams described herein are just for example. There may be many variations to these steps or operations without departing from the principles discussed above. For instance, the steps may be performed in a differing order, or steps may be added, deleted, or modified.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A system comprising:
a plurality of microphones co-located with one another, each microphone of the plurality of microphones being configured to generate a signal representative of sound incident upon the plurality of microphones; and
a processor configured to determine data indicative of a location of a source of the sound based on the signals representative of the incident sound;
wherein the plurality of microphones comprise a directional microphone configured to generate a signal representative of a directional component of the sound, the directional microphone comprising a structure movably responsive to sound along a single axis over an entire audible frequency range;
wherein the processor is further configured to determine a ratio of direct sound energy and diffuse sound energy (DDR) for the incident sound as a function of the signals representative of the incident sound, and to determine a direction of arrival (DOA) for the incident sound based on the signals representative of the incident sound, and to determine the location of the source of the incident sound based on the determined DDR and the determined DOA.

2. The system of claim 1, wherein:
the directional microphone is a first directional sensor element microphone of the plurality of microphones configured to generate a first signal representative of a first directional component of sound;
the plurality of microphones comprise a second directional microphone configured to generate a second signal representative of a second directional component of the sound; and
the first and second directional microphones are configured such that the first and second directional components are oriented orthogonally relative to one another.

3. The system of claim 1, wherein the plurality of microphones are disposed relative to one another such that the sound is effectively coincident upon each microphone of the plurality of microphones.

4. The system of claim 1, further comprising an enclosure, wherein:
the directional microphone is one of multiple directional microphones of the plurality of microphones; and
the multiple directional microphones are disposed in the enclosure.

5. The system of claim 1, wherein:
the directional microphone is one of multiple directional microphones of the plurality of microphones; and
the multiple directional microphones are disposed in a side-by-side arrangement on a substrate.

6. The system of claim 1, wherein:
the directional microphone is one of multiple directional microphones of the plurality of microphones; and
the processor is configured to process the signals generated by the multiple directional microphones to determine directional component data indicative of the directional components of the sound in multiple directions.

7. The system of claim 6, wherein the processor is further configured to determine the directional component data as a function of a target spatial coherence and a measured spatial coherence between at least two of the signals generated by the plurality of directional microphones.

8. The system of claim 6, wherein the processor is further configured to determine the direction of arrival of the incident sound based on the directional component data.

9. The system of claim 8, wherein the processor is further configured to compute the measured spatial coherence and a difference of levels between at least one pair of signals generated by the multiple directional microphones to determine the direction of arrival.

10. The system of claim 8, wherein the processor is further configured to compute a spatial coherence matrix for the signals generated by the multiple directional microphones, such that the direction of arrival is determined based on at least one property of the spatial coherence matrix.

11. The system of claim 8, wherein the processor is further configured to implement a time domain method to determine the direction of arrival.

12. The system of claim 6, wherein the processor is further configured to determine a distance between the source and the acoustic sensor device based on the directional component data.

13. The system of claim 12, wherein the processor is further configured to determine a set of acoustic features of the incident sound based on the generated signals, and to implement a classifier to determine the distance based on the set of acoustic features.

14. The system of claim 13, wherein the classifier comprises a support vector machine.

15. The system of claim 13, wherein the set of acoustic features comprises multiple time-frequency estimators, the multiple time-frequency estimators specifying levels of the signals, the direction of arrival, a reverberation time and relative levels of direct and diffuse sound.

16. The system of claim 1, wherein:
the plurality of microphones further comprise a pressure microphone; and
the processor is further configured to compare a signal generated by the pressure microphone with the signal generated by the directional microphone to determine the distance.

17. The system of claim 16, wherein:
the processor is further configured to generate relative phase data, relative amplitude data, or both relative phase and relative amplitude data for the signal generated by the pressure microphone and the signal generated by the directional acoustic sensor element; and
the processor is further configured to implement a classifier to which the relative phase data, the relative amplitude data, or both the relative phase and amplitude data is provided to determine the distance.

18. The system of claim 1, further comprising an output device, the output device comprising a controller, wherein the controller is configured to control a characteristic of an output of the output device based on the location of the source.

19. The system of claim 1, wherein adjacent microphones of the plurality of microphones are spaced apart from one another less than an order of centimeters.

20. The system of claim 1, wherein adjacent microphones of the plurality of microphones are spaced apart from one another by less than 1 cm.

* * * * *

UNITED STATES PATENT AND TRADEMARK OFFICE
CERTIFICATE OF CORRECTION

PATENT NO. : 12,075,210 B2  
APPLICATION NO. : 17/765733  
DATED : August 27, 2024  
INVENTOR(S) : Frederic Francois Leon Lepoutre, Sahil Kumar Gupta and Lucas Henrique Teixeira Carneiro Page 1 of 1

It is certified that error appears in the above-identified patent and that said Letters Patent is hereby corrected as shown below:

In the Claims

Column 27, Claim 2:  
Please remove the word "sensor" from Line 44  
Please remove the word "element" from Line 45

Signed and Sealed this  
Fourth Day of March, 2025

Coke Morgan Stewart  
*Acting Director of the United States Patent and Trademark Office*